(12) United States Patent
Phillips et al.

(10) Patent No.: US 10,516,715 B2
(45) Date of Patent: *Dec. 24, 2019

(54) NETWORK-CONTROLLED TIME-SHIFT LIVE MEDIA AND ADVERTISEMENT CONTENT PLAY FOR LEARNED ABR VIDEO WHITE SPOT COVERAGE IN A STREAMING NETWORK

(71) Applicant: TELEFONAKTIEBOLAGET LM ERICSSON (PUBL), Stockholm (SE)

(72) Inventors: Chris Phillips, Hartwell, GA (US); Salah Chaou, Waltham, MA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 78 days.

This patent is subject to a terminal disclaimer.

(21) Appl. No.: 15/189,503

(22) Filed: Jun. 22, 2016

(65) Prior Publication Data
US 2017/0374121 A1  Dec. 28, 2017

(51) Int. Cl.
*H04L 29/06* (2006.01)
*H04L 29/08* (2006.01)
(Continued)

(52) U.S. Cl.
CPC ........ *H04L 65/604* (2013.01); *H04L 65/1083* (2013.01); *H04L 65/4069* (2013.01);
(Continued)

(58) Field of Classification Search
CPC .. H04L 65/604; H04L 65/607; H04L 65/4069
See application file for complete search history.

(56) References Cited

U.S. PATENT DOCUMENTS

| 2006/0212531 A1* | 9/2006 | Kikkawa ........... H04L 29/06027 709/217 |
| 2009/0010156 A1* | 1/2009 | Song ................... H04L 12/2803 370/230 |

(Continued)

FOREIGN PATENT DOCUMENTS

| EP | 2 048 884 A1 | 4/2009 |
| WO | WO 2008/093340 A2 | 8/2008 |
| WO | WO 2014/004955 A1 | 1/2014 |

OTHER PUBLICATIONS

Singh V. et al.: "Predictive buffering for streaming video in 3G networks", World of Wireless. Mobile and Multimedia Networks (WOWMOM). 2012 IEEE International Symposium on a. IEEE. Jun. 25, 2012 (Jun. 25, 2012). pp. 1-10.

*Primary Examiner* — June Y Sison
*Assistant Examiner* — Steven C Nguyen

(57) ABSTRACT

A scheme for managing ABR live media streaming of content in a wireless radio network environment that may have radio white spot areas. Upon determining that the wireless UE device executing an ABR client application is in a radio white spot area, the current ABR live media streaming session is time-shifted for a duration based on how long a service outage may last. During the video service outage, playback of advertisements pre-populated at the wireless UE device may be commenced. When the wireless UE device exits the radio white spot area, the ABR streaming session may be resumed to play the time-shifted media content from a point adjacent to the particular segment where the ABR streaming session was time-shifted.

12 Claims, 21 Drawing Sheets

(51) Int. Cl.
    *H04N 21/6543*     (2011.01)
    *H04N 21/24*     (2011.01)
    *H04N 21/433*     (2011.01)
    *H04N 21/262*     (2011.01)
    *H04W 88/02*     (2009.01)

(52) U.S. Cl.
    CPC ........ *H04L 65/4084* (2013.01); *H04L 65/607* (2013.01); *H04L 65/608* (2013.01); *H04L 65/80* (2013.01); *H04L 67/2847* (2013.01); *H04N 21/2402* (2013.01); *H04N 21/26258* (2013.01); *H04N 21/4331* (2013.01); *H04N 21/6543* (2013.01); *H04L 67/289* (2013.01); *H04W 88/02* (2013.01)

(56) References Cited

U.S. PATENT DOCUMENTS

| | | |
|---|---|---|
| 2012/0009890 A1 | 1/2012 | Curcio et al. |
| 2012/0099514 A1* | 4/2012 | Bianchetti ........ H04N 21/41422 370/312 |
| 2014/0344443 A1 | 11/2014 | Macinnis et al. |
| 2015/0085875 A1 | 3/2015 | Phillips et al. |
| 2015/0229694 A1 | 8/2015 | Reynolds et al. |
| 2015/0249622 A1 | 9/2015 | Phillips et al. |
| 2015/0256581 A1* | 9/2015 | Kolhi .................... H04L 65/602 709/219 |
| 2015/0358689 A1 | 12/2015 | Wen et al. |
| 2017/0353776 A1* | 12/2017 | Holden ................ H04N 21/814 |

* cited by examiner

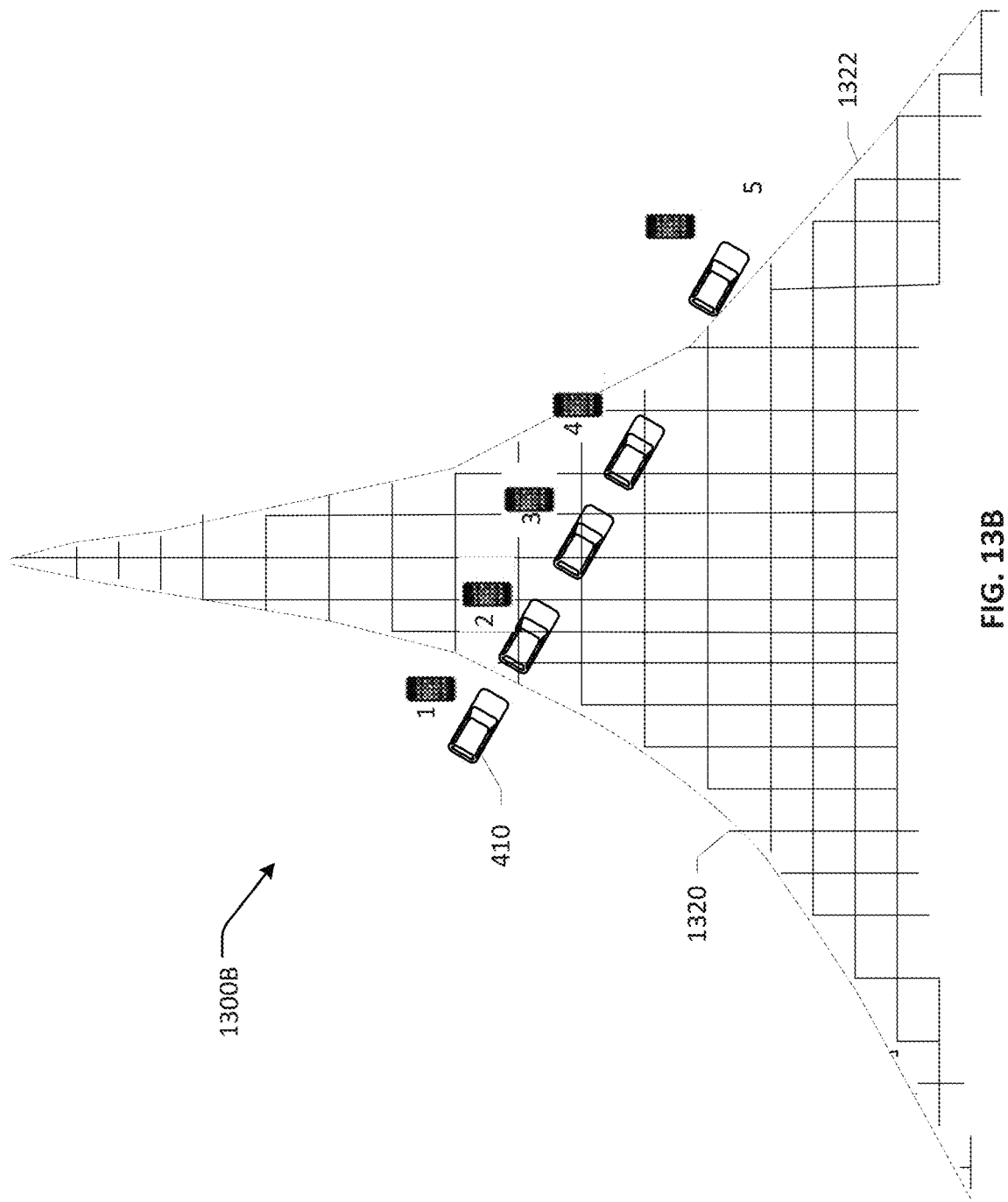

NETWORK-CONTROLLED TIME-SHIFT LIVE MEDIA AND ADVERTISEMENT CONTENT PLAY FOR LEARNED ABR VIDEO WHITE SPOT COVERAGE IN A STREAMING NETWORK

FIELD OF THE DISCLOSURE

The present disclosure generally relates to communication networks. More particularly, and not by way of any limitation, the present disclosure is directed to a scheme for managing coverage in a wireless network environment configured to facilitate adaptive bitrate (ABR) streaming of live media content.

BACKGROUND

While mobile radio data network coverage is widespread, there may be areas where data coverage is low or where there is an above average amount of channel noise due to various factors such as, e.g., structures, interference, weather, etc. Although phone calls can generally overcome these issues by switching to a different network protocol, video delivered over data networks generally cannot. Accordingly, when consuming video via ABR streaming while traveling though an area of low coverage or poor signal quality, it is becomes necessary to manage a user's experience in a satisfactory manner, especially in a broadcast live media streaming environment.

SUMMARY

The present patent disclosure is broadly directed to systems, methods, apparatuses, devices, and associated non-transitory computer-readable media for managing ABR streaming sessions in a wireless network environment that may have potential video outage areas (also referred to herein as "white spots"). In one embodiment, a radio white spot coverage method for a wireless user equipment (UE) device engaged in an ABR live media streaming session is disclosed. The claimed embodiment comprises, inter alia, determining that the wireless UE device is in a radio white spot area (i.e., an area having poor video QoS) and providing an updated manifest file to the wireless UE device including a reference to a service outage notification message and one or more references to advertisement segments locally cached at the wireless UE device that have been downloaded prior to entering the white spot area (i.e., video outage area). A persistent connectivity state for the live media streaming session is maintained, e.g., based on a unique streaming session identifier. Live media stream of the ABR streaming session is time-shifted for a duration responsive to an estimation of how long service outage is to last depending on an estimated travel direction and estimated speed associated with the wireless UE device.

In another aspect, an embodiment of a network node, system or apparatus comprising, e.g., an ABR stream delivery server, is disclosed for facilitating ABR live media streaming sessions in a wireless radio network environment. One or more processors are operatively coupled to an outage area request module configured to request anticipated video outage areas with respect to a wireless UE device, the anticipated video outage areas being based on the wireless UE device's current location and estimated direction of travel in the wireless radio network environment. An advertisement request module operating under control of the one or more processors is provided for obtaining advertisement content from an advertisement server, wherein the advertisement content may be location-specific and/or based on subscriber demographics, e.g., relevant with respect to the anticipated video outage areas of the wireless UE device. A persistent memory is provided for storing program instructions, which perform the following operations when executed by the one or more processors: determine that a wireless UE device engaged in an ABR live media streaming session has entered a video outage area; provide an updated manifest file to the wireless UE device, the updated manifest file including a reference to a service outage notification message and one or more references to advertisement content locally cached at the wireless UE device that is downloaded prior to the wireless UE device entering the video outage area; maintain a persistent connectivity state for the ABR live media streaming session and effectuate time-shifting of the ABR live media stream for a duration responsive to an estimation of how long service outage is to last depending on an estimated travel direction and an estimated speed associated with the wireless UE device; and when the wireless UE device exits the video outage area, provide one or more updated manifests to the wireless UE device including references to the time-shifted ABR live media stream.

In one variation, the persistent memory of a network node may further include instructions for performing the following: enable credit allocation for advertisements in the time-shifted ABR live media stream; responsive to enabling credit allocation for the advertisements in the time-shifted ABR live media stream, omit updating of manifests for the advertisements in the time-shifted ABR live media stream; and store updated manifests only for media segments of the time-shifted ABR live media stream.

In a still further variation, the persistent memory of a network node may further comprise instructions of performing the following: determine if the wireless UE device stopped playing the advertisement content locally cached at the wireless UE device while in the video outage area; and if so, terminate the persistent connectivity state for the ABR live media streaming session and provide a manifest associated with non-time-shifted ABR live media to the wireless UE device when the wireless UE device exits the video outage area.

In a further aspect, a method operating at a wireless UE device engaged in an ABR live media streaming session is disclosed. In one embodiment, the method comprises, inter alia, transmitting, by the wireless UE device, current location information, speed and travel direction associated with the wireless UE device to a network node; and responsive thereto, receiving estimated video outage area information from the network node. A request is transmitted to the network node for facilitating preloading of advertisement content prior to entering an outage area, the request preferably including an estimated duration of service outage, among others. Responsive thereto, suitable advertisement content is received from the network node to be played for the estimated duration. One example implementation may involve obtaining an estimation of how long service outage is to last in the outage area based on an estimated travel direction and an estimated speed associated with the wireless UE device. In another variation, a notification may be transmitted to the network node to time-shift the live media stream of the ABR streaming session at a specific point in the media stream, preferably for the duration of the outage.

In a related aspect, a wireless UE device operative in a live ABR streaming environment is disclosed. In one embodiment, the wireless UE device comprises a cache for storing advertisement content downloaded from a network node while the wireless UE device is in radio coverage having a sufficient signal quality for supporting an overall bandwidth rate that is greater than a bandwidth rate necessary for facilitating an ABR live media streaming session of content encoded at a highest bitrate. An ABR buffer is provided for storing media segments determined to be downloaded at bitrate(s) based on a calculated bandwidth available to an ABR client application as well as any ads moved from the cache. An ABR client player is configured to play back content out of the ABR buffer. One or more processors are coupled to a persistent memory having program instructions for controlling the ABR client player and configured to perform the following: transmit current location information, speed and travel direction associated with the wireless UE device to a network node; receive estimated video outage area information from the network node, the estimated video outage area information being determined responsive to the current location information, speed and travel direction provided by the wireless UE device; send a request to the network node for facilitating preloading of advertisement content prior to entering an outage area; and receive the advertisement content from the network node for storage in the cache, the advertisement content to be played for a duration responsive to an estimation of how long service outage is to last in the outage area based on an estimated travel direction and an estimated speed associated with the wireless UE device.

In one variation, the persistent memory of the wireless UE device may further include instructions for performing: upon entering the outage area, provide an alert or user notification that the ABR live media streaming session will be time-shifted for the duration of service outage; move the cached advertisement content into the ABR buffer; commence playout of the advertisement content by the ABR client player without having to receive updated manifests from the network node for the advertisement content; and provide a message to the network node to time-shift the live media stream of the ABR streaming session at a specific point in the media stream, preferably for the duration of the outage. The persistent memory may further include instructions for performing: upon exiting the outage area, receive manifests from the network node with respect to the time-shifted ABR live media stream and resume the time-shifted ABR live media streaming session by the ABR client player based on the received manifests. In a further variation, the persistent memory of the wireless UE device may include instructions for determining that there was credit allocation for the advertisement content; and responsive to the determining, deleting advertisement segments of the resumed time-shifted ABR live media streaming session.

In still further aspects, one or more embodiments of a non-transitory computer-readable medium containing computer-executable program instructions or code portions stored thereon are disclosed for performing one or more embodiments of the methods of the present invention when executed by a processor entity of a network node, element, virtual appliance, UE device, and the like, mutatis mutandis. Further features of the various embodiments are as claimed in the dependent claims.

Advantages of the present invention include, but not limited to, the ability to adapt to ad hoc issues such as, e.g., inclement weather interference, variable low radio quality, noise, etc. that may be encountered in a wireless ABR live media streaming environment, wherein there is usually enough bandwidth in normal conditions to both pre-cache advertisement clips as well as watch a video or other requested programming simultaneously. As will be seen hereinbelow, a video outage learning process accompanying one or more implementations is operative to provide a video QoS-aware location database with respect to an wireless network environment. Accordingly, advertisement segments and other alternative information pre-cached or pre-populated for users may be tailored to user demographic information and/or outage locations, which provides for an enriched user experience that not only feels less intrusive but also more informative. Because both pre-caching and streaming of ABR media segments may be facilitated when adequate bandwidth is available in the network, only minimal or no special implementational modifications are necessary with respect to deploying certain embodiments of the present disclosure in order to receive tailored advertisements. Further, as the advertisement clips typically need less data than normal video streaming, multiple advertisement clips can be cached once and played back several times, with the ability to update the clips relevant to newer video outage areas when needed. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
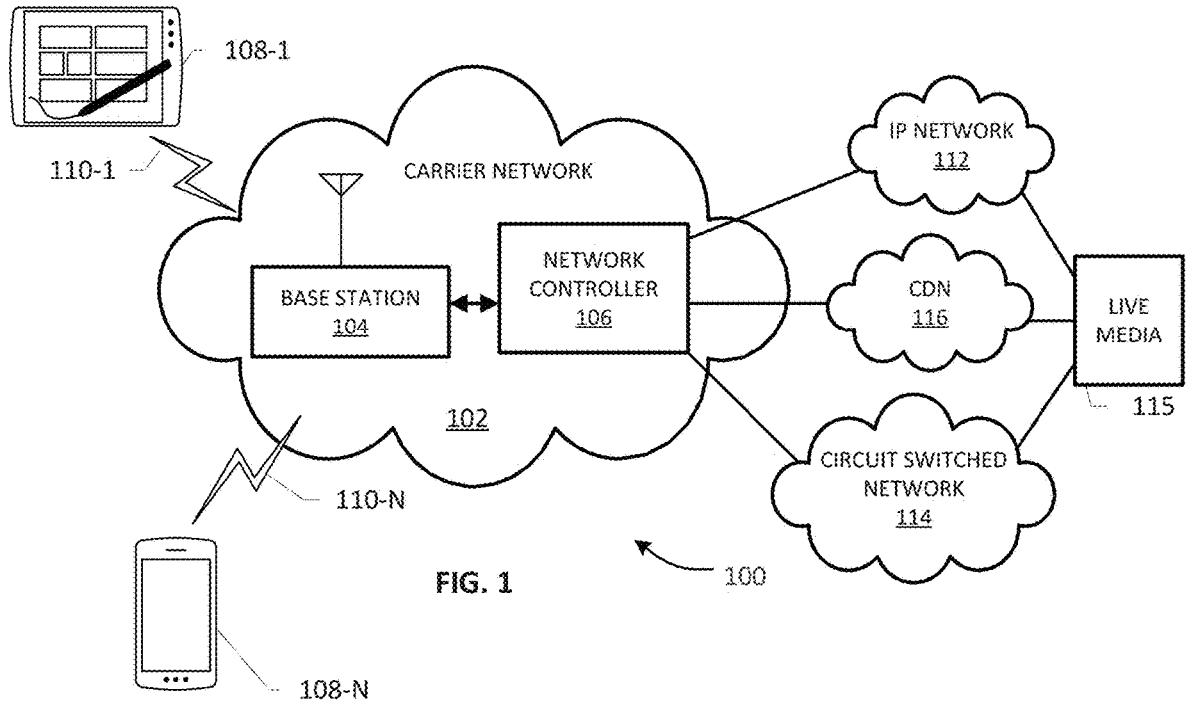
FIG. 1 depicts an example wireless network environment for facilitating ABR live media streaming according to one or more embodiments of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. In still further arrangements, one or more network elements may be disposed in a cloud-based platform or datacenter having suitable equipment running virtualized functions or applications. Accordingly, at least some network elements may comprise "multiple services network elements" that provide support for multiple network-based functions (e.g., A/V media management, session control, Quality of Service (QoS) policy enforcement, bandwidth scheduling management, subscriber/device policy and profile management, content provider priority policy management, streaming policy management, advertisement push policy management, and the like), in addition to providing support for multiple application services (e.g., data and multimedia applications). Subscriber end stations or client devices may comprise any device configured to execute, inter alia, a streaming client application (e.g., an ABR streaming client application) for receiving live media content from one or more content providers, e.g., via mobile telephony networks based on a variety of radio access technologies, standards and protocols. Such client devices may therefore include portable laptops, netbooks, palm tops, tablets, mobile phones, smartphones, multimedia/video phones, mobile/wireless user equipment, portable media players, portable gaming systems or consoles (such as the Wii®, Play Station 3®, etc.) and the like that may access or consume live media content/services provided over a delivery network or a combination of networks via a suitable high speed wireless connection for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example wireless network environment 100 for facilitating ABR streaming according to one or more embodiments of the present patent application. A plurality of exemplary wireless or mobile devices or user equipment (UE) devices 108-1 to 108-N (also referred to as ABR client devices) are shown as being operational in the wireless environment 100 comprising an exemplary mobile communication network or carrier network 102. In the discussion herein, the terms "wireless network," "mobile communication network," "carrier network", or terms of similar import may be used interchangeably to refer to a wireless communication network (e.g., a cellular network, a proprietary data communication network, a corporate-wide wireless network, etc.) that facilitates voice and/or data communications with different types of wireless mobile devices (e.g., devices 108-1 to 108-N). In one embodiment, such devices may be a User Equipment (UE) or a Mobile Station (MS) (also known by various analogous terms such as "mobile handset," "wireless handset," "mobile device," "mobile terminal," etc.) capable of receiving adaptively streamed/delivered audio-visual content from the network 102 and playing it using a local ABR client player application executing thereon. In some other embodiments, wireless mobile devices may comprise portable gaming devices, electronic tablets, phablets, portable WiFi-connected TVs, laptops equipped with suitable wireless modems, e-readers, and the like, as alluded to previously. For purposes of the present invention, the terms "wireless UE device", "subscriber end station", "mobile device", "ABR client/player device", or terms of similar import may be used interchangeably in the context of a particular embodiment.

The wireless UE devices 108-1 to 108-N are shown to be in wireless communication (via respective radio links 110-1 to 110-N) with the wireless network 102 through one or more base stations, e.g., base station (BS) 104 (also interchangeably referred to herein as a "mobile communication network node" or simply a "node") of the network 102. The example base station 104 may provide radio interface (in the form of suitable Radio Frequency (RF) links depending on the particular mobile communications technology) to devices 108-1 to 108-N via appropriate antenna elements. By way of example, the base station 104 may comprise a base station in a Third Generation (3G) network, or an evolved Node-B (eNodeB or eNB) when the carrier network is a Third Generation Partnership Project's (3GPP) Long Term Evolution (LTE) network. In some example embodiments, the base station 104 may also include a site controller, an access point (AP), a radio tower, or any other type of radio interface device capable of operating in a wireless environment. In addition to providing air interface or wireless channel (e.g., as represented by wireless links 110-1 to 110-N) to the wireless UE devices, the communication node (or base station) 104 may also perform radio resource management (as, for example, in case of an eNodeB in an LTE system). In case of a 3G carrier network, example base station 104 may include functionalities of a 3G base station along with some or all functionalities of a 3G Radio Network Controller (RNC). Additionally, base station 104 may be part of an Access Network (AN) (not shown) portion of the carrier network 102, wherein the AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a Worldwide Interoperability for Microwave Access (WiMAX) network, and the like.

Accordingly, where an example subscriber ABR client device may be provided as a wireless mobile communications device, it may include multi-band interfacing functionality compliant with at least one of a General Packet Radio Service (GPRS) network, an Enhanced Data Rates for Global System for Mobile Communications (GSM) Evolution (EDGE) network, a 3rd Generation Partnership Project (3GPP)-compliant network (e.g., Universal Mobile Telecommunications System (UMTS) network, HSPA), a 4G network (e.g., Long Term Evolution (LTE) network), a 5G network, a Next Generation Network (NGN), an Integrated Digital Enhanced Network (IDEN), a Code Division Multiple Access (CDMA) network, a Time Division Multiple Access (TDMA) network, an IP Multimedia Subsystem (IMS) networks, etc. in addition to having short-range radio access based on a standard selected from at least one of IEEE 802.11 standard, IEEE 802.16 standard, HiperLan standard, HiperLan II standard, Wi-Max standard, OpenAir standard, Bluetooth standard, etc.

Broadly, the infrastructure of an example network 102 may include a network controller 106 coupled to the base station 104 for providing logical and control functions relative to, e.g., roaming support and/or terminal mobility management, subscriber account management, billing, etc., as well as accessing of external networks or communication entities and delivery of streamed A/V content from one or more content sources. By way of example, connectivity to other networks or infrastructures such as, for instance, the Internet or a cloud platform 112, CDN 116 and a circuit-switched landline telephone network (i.e., a Public-Switched Telephone Network or PSTN) 114, is illustrated, at least a portion of which may be coupled to one or more live media sources or providers 115. Media content from live sources 115 may comprise live programming captured relative to any type of event, e.g., sporting/entertainment/gaming events, concerts, live TV shows, live news broadcasting, etc.

In case of an LTE carrier network, network controller 106 may include some or all functionalities of an Access Gateway (AGW) or an Evolved Packet Core (EPC) node. In certain embodiments, such functionalities may comprise, for example, an IMT core network functionality or an ETSI TISPAN (European Telecommunications Standards Institute TIPHON (Telecommunications and Internet Protocol Harmonization over Networks) and SPAN (Services and Protocols for Advanced Networks)) core network functionality. Regardless of a particular implementation of the carrier network, base station 104 and/or network controller functionality 106 may be configured to facilitate, in conjunction with or independent of one or more external network entities and databases, a scheme for controlling delivery of ABR live media streaming sessions to wireless UE devices in potential video outage areas that may be encountered in the wireless network environment 100, as will be set forth in detail hereinbelow.

Skilled artisans will further recognize that various nodes and functionalities set forth above with respect to the network environment 100 (for instance, access network elements (e.g., base station controllers (BSCs), base transceiver stations (BTSs), radio network controllers (RNCs), etc.) as well as CDN infrastructures, media provider infrastructures, and the like, may be virtualized using suitable network function virtualization (NFV) architectures implemented in one or more cloud-based data centers or platforms as exemplified by the Internet/cloud platform 112. Additionally, certain aspects of the subscriber devices 108-1 to 108-N may also be virtualized in a cloud and/or provided as software-centric applications that can be local (i.e., on the device).

Figure 2:
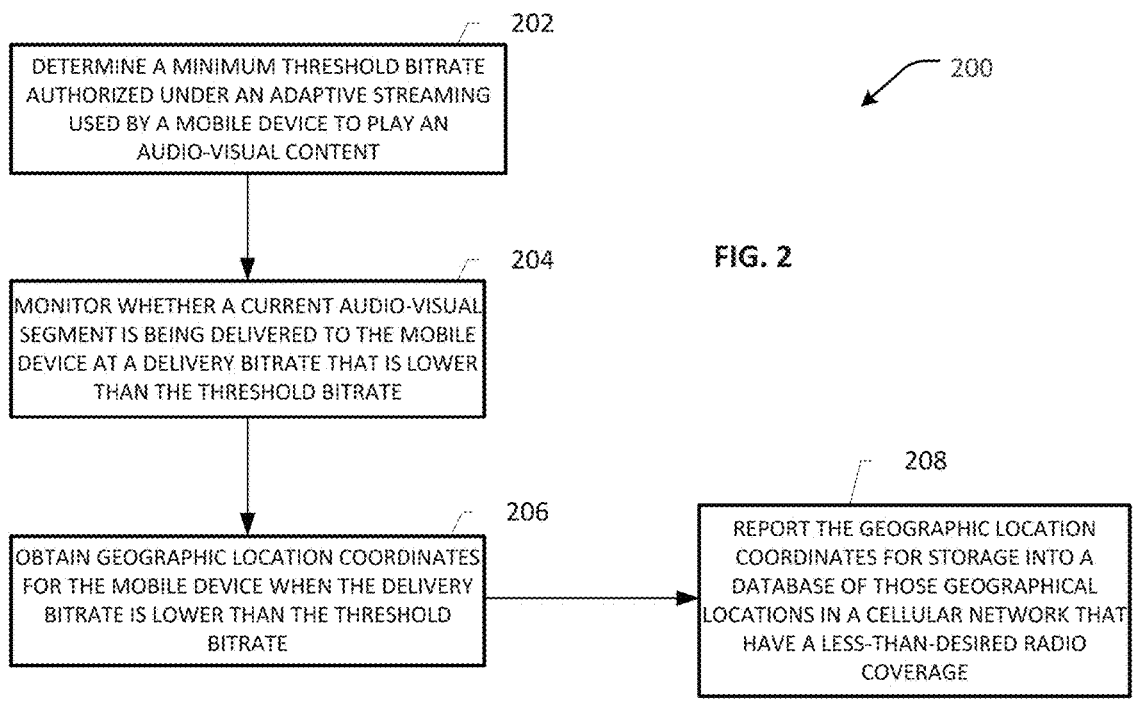
FIG. 2 depicts a flowchart of an example methodology for building a database of video outage areas (i.e., radio white spot areas) according to an embodiment for purposes of the present patent application.

FIG. 2 depicts a flowchart of an example methodology 200 for building a database of video outage areas (i.e., radio white spot areas) according to an embodiment for purposes of the present patent application. As shown at block 202 in FIG. 2, a network entity (e.g., in the carrier network 102 or a subscriber policy management node associated with CDN 116 of FIG. 1) may initially determine a minimum threshold bitrate (e.g., for enforcing a QoS policy) authorized under an adaptive streaming technique used by a mobile device (e.g., wireless UE device 108-1) to play an audio/visual content file or program. The network entity may then monitor whether a current audio/visual segment is being delivered to the wireless UE device at a delivery bitrate that is lower than the threshold bitrate (block 204). When the delivery bitrate of the current streaming segment is determined to be lower than the threshold bitrate, the network entity may obtain the geographic location coordinates for the wireless UE device (block 206) because such reduced delivery bitrate may indicate a less than acceptable service, possibly due to various radio signal quality conditions, including a radio outage condition. Thereafter, the network entity may report those geographical location coordinates for storage into a database (block 208), which may be configured to maintain a dataset of geo-locations (e.g., in the form of location coordinates) with respect to the geographical area of the network 102 that have a less-than-desired radio coverage. Those skilled in the art will recognize that the dataset of video outage areas is not static and may not necessarily mean that there is a complete radio outage at the reported locations. Depending on variable signal parameters, improvements to the infrastructure, changes in the environmental and structural elements (e.g., buildings, towers, etc.) within the wireless network environment, and the like, a location database of potential white spot areas may be continually and/or dynamically updated as needed (i.e., by way of a learning process). Furthermore, white spot area databases and/or server systems hosting such databases may be provided with suitable application program interfaces or APIs that facilitate interaction with other network entities and services, e.g., including bandwidth control. Additional details regarding such techniques may be found in one or more of the following commonly owned co-pending U.S. patent application(s): (i) "ADAPTIVE VIDEO WHITE SPOT LEARNING AND USER BANDWIDTH DELIVERY CONTROL SYSTEM", application Ser. No. 14/036,841, filed Sep. 25, 2013, published as US 2015/0085875, in the name(s) of Christopher Phillips et al.; and (ii) "ABR VIDEO WHITE SPOT COVERAGE SYSTEM AND METHOD", application Ser. No. 14/200,491, filed Mar. 7, 2014, published as US 2015/0256581, in the name(s) of Christopher Phillips et al.; hereby incorporated by reference herein.

Figure 3A:
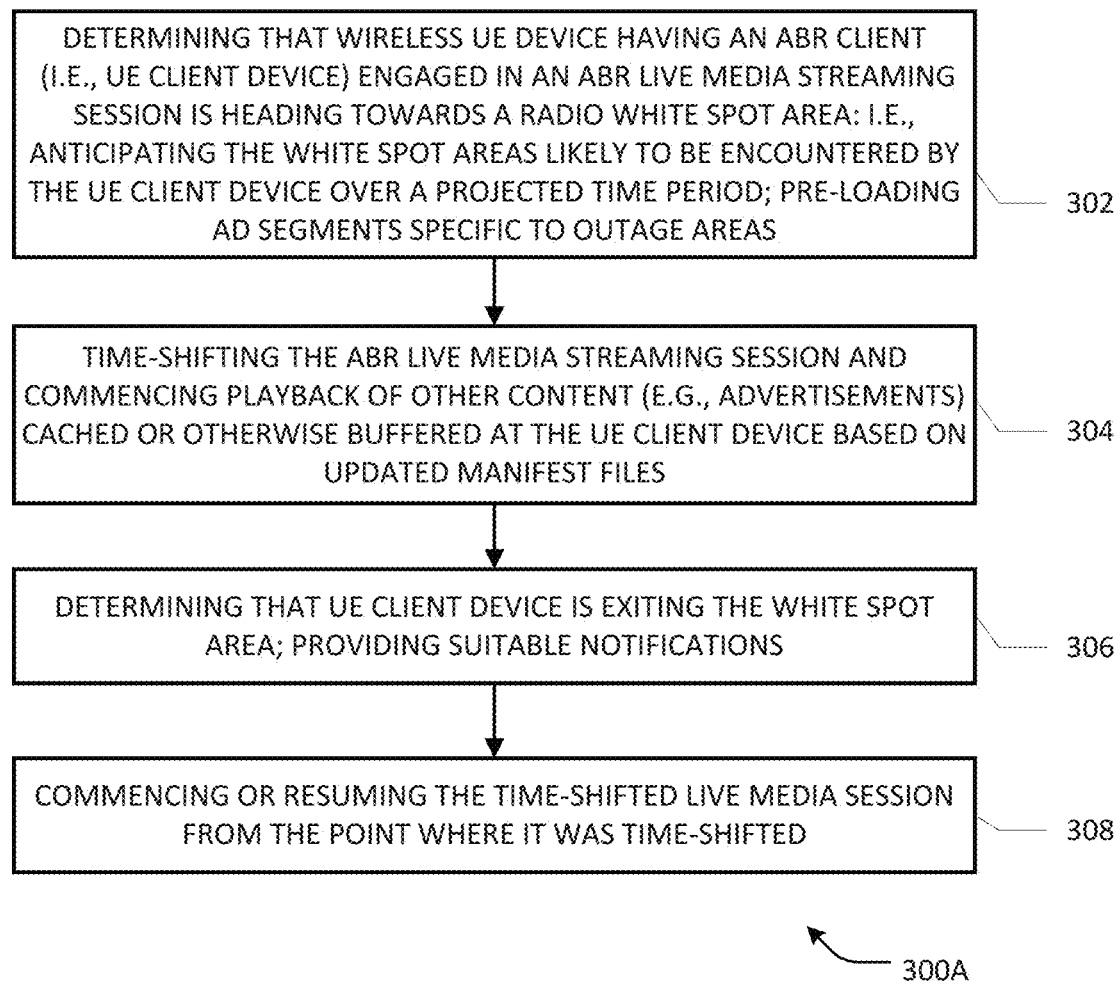
FIGS. 3A-3C depict flowcharts of various blocks, steps and/or acts that may be (re)combined in one or more arrangements that illustrate one or more embodiments of the present patent disclosure for optimizing user experience while traversing a white spot area of an ABR wireless network environment.
Figure 3B:
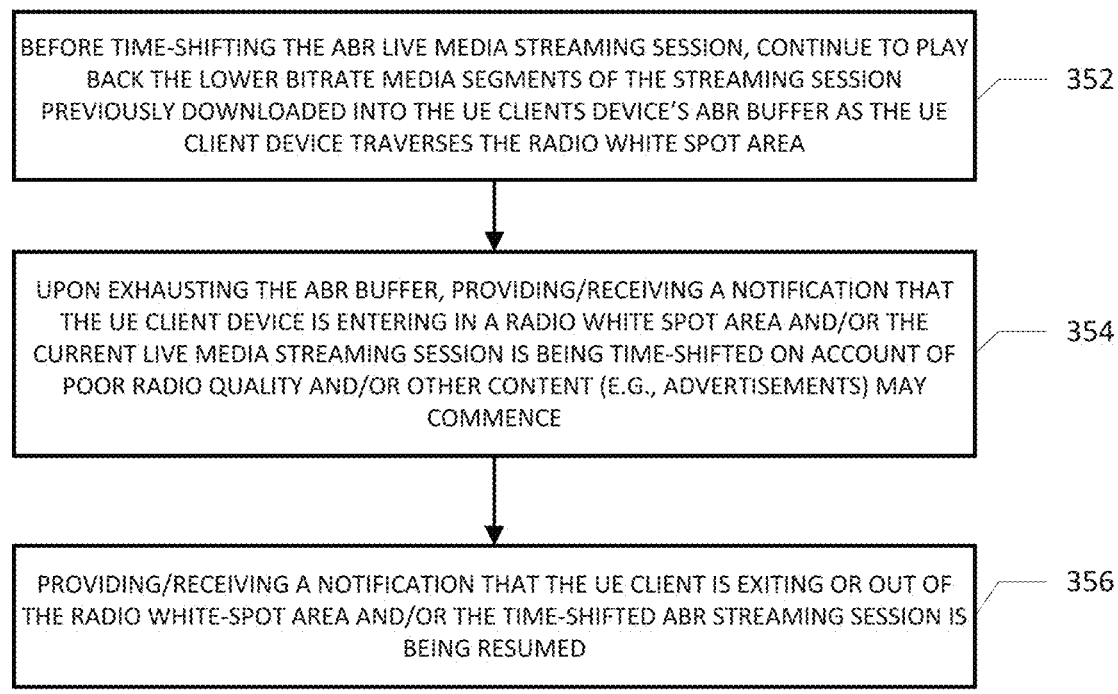
Figure 3C:
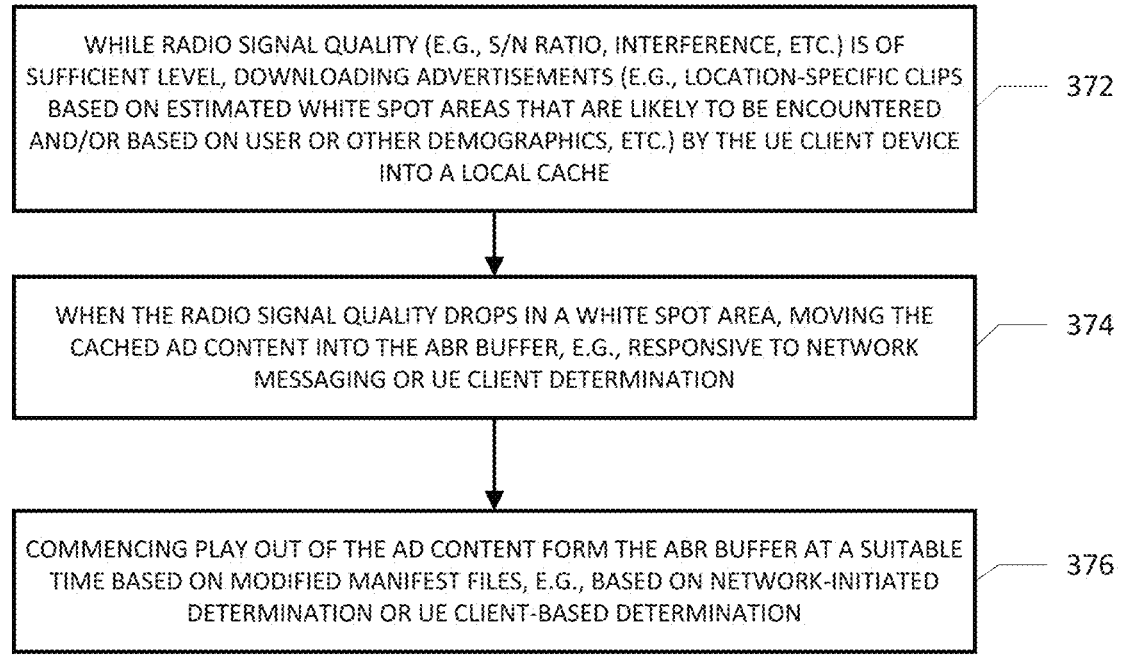

FIGS. 3A-3C depict flowcharts of various blocks, steps and/or acts that may be combined in one or more arrangements that illustrate one or more embodiments of the present patent disclosure for optimizing user experience while traversing a radio white spot area of a wireless network configured for supporting an ABR live media streaming environment. Reference numeral 300A in FIG. 3A generally refers to a broad methodology for providing radio white spot coverage for a wireless UE device engaged in an ABR live media streaming session according to one embodiment. For purposes of the present patent application, the wireless UE device may be configured to receive or otherwise consume a variety of live content via streaming sessions effectuated over a suitable wireless connection (e.g., via broadcast, narrowcast, multicast or unicast), which streaming sessions may at least partly involve delivery or distribution of convent via a delivery network such as CDN 116 disposed between the wireless network serving the wireless UE device (regardless of whether the wireless network is a home network or a visited network) and one or more live media sources 115. As one skilled in the art will appreciate, example CDN 116 may comprise an overlay network architected for high-performance streaming of a variety of live digital assets or program assets as well as services (hereinafter referred to as "content") to subscribers, including wireless/mobile equipment users, using one or more Internet-based infrastructures, private/dedicated infrastructures or a combination thereof. In general, the terms "content", "content files", or "media segments" or "media stream" and the like as used in reference to at least some embodiments of the present patent disclosure may include a variety of live programming media or digital assets and program assets appropriately processed at a network entity. In addition, those skilled in the art will further recognize that an example streaming network environment may be architected as a hierarchical organization wherein the various content sources and associated media processing systems (media encoders, segmentation and packaging, etc.), back office management systems, subscriber/content policy and QoS management systems, bandwidth allocation modules, and the like may be disposed at different hierarchical levels of the network architecture in an illustrative implementation, e.g., super headend (SHE) nodes, regional headend (RHE) nodes, video hub office (VHO) nodes, IPTV service nodes, etc. that ultimately provide the media content streams to one or more serving edge node portions and associated radio/wireless access networks for further distribution to subscribers, wherein the live media may be encoded using standards or specifications including but not limited to, e.g., Moving Pictures Expert Group (MPEG) codecs (MPEG, MPEG-2, MPEG-4, etc.), H.264 codecs, High Efficiency Video Coding or HEVC (H.265) codecs, and the like.

Additionally, the live media streams may also include advertisements inserted at various levels, e.g., national network levels, regional network levels, and/or local network levels. At the national network level, advertisements are often inserted into the network feed before the broadcast content is transmitted over, for example, a particular national distribution network. At the regional network level, local advertisements may be inserted into a received national feed by, for example, the regional/local radio or TV broadcast station and such advertisements may typically replace some or all of the national network advertisements. Such local advertisements may be targeted to the particular demographics of the subscribers of a broadcast station service area and may advertise any number/type of local businesses, e.g., local grocery stores, restaurants, etc. In the context of digital live media transmission, an ABR streaming infrastructure may utilize ANSI/SCTE-35 based processes to indicate appropriate cue-in and cue-out avails (for signaling ad insertion markers and ad endpoint markers) to combine a primary stream (e.g., live programming media content) and a secondary stream (e.g., advertisement content) in a particular streaming session, wherein appropriate manifests may be provided to the ABR clients with respect to both types of content as needed.

By way of illustration, content delivered via the serving wireless network (e.g., carrier network 102) may be streamed using suitable ABR streaming techniques to support Microsoft® Silverlight® Smooth Streaming, HTTP streaming (for instance, MPEG Dynamic Adaptive Streaming over HTTP or DASH, HTTP Live Streaming or HLS, HTTP Dynamic Streaming or HDS, etc.), Icecast, and so on.

In one arrangement, the overlay architecture of CDN 116 may include a multi-level, hierarchically-organized interconnected assembly of network servers for providing media pathways or "pipes" from one or more central distribution nodes to one or more levels of regional distribution nodes that are connected to one or more local edge servers and/or radio network entities configured to serve a plurality of end users or subscribers in respective serving location areas. In addition to such "distribution servers", CDN 116 may also include and/or interoperate with various network elements configured to effectuate request redirection or rerouting mechanisms as well as related back office systems or nodes that may be deployed as part of a streaming network back office infrastructure (not specifically shown in FIG. 1).

Continuing to refer to FIG. 3A, a determination may be made at block 302 that the wireless UE device including a suitable ABR client or player and currently engaged in an ABR live media streaming session is heading towards and/or entering a radio white spot area based on a variety of techniques for positioning/locating and estimating a travel direction of a mobile device known in the art. For example, such techniques may comprise positioning methods based on radio cell coverage, Global Positioning System (GPS), Assisted GPS (A-GPS), Global Navigation Satellite System (GLONASS), Galileo, or other satellite based systems/methods, or Time-Of-Arrival (TOA), Uplink Time Difference Of Arrival (UTDOA), Observed Time Difference Of Arrival (OTDOA), or Enhanced Observed Time Difference (E-OTD) methods. In general, additional description of the positioning methods in a cellular network may be found in such 3GPP Technical Specifications (TS) as, for example, the TS 36.305 (E-UTRAN; Stage 2 functional specification of UE positioning in E-UTRAN), the TS 25.305 (Stage 2 functional specification of UE positioning in UTRAN), and TS 43.059 (Functional stage 2 description of Location Services (LCS) in GERAN). Many of these positioning methods may be based on network triangulation, Wi-Fi positioning, and/or wireless UE device's internal sources such as accelerometers, position sensors, etc., in addition to utilizing speed/direction estimations of a vehicle in which the wireless UE device may be operating. Accordingly, given a set of current location coordinates of the wireless UE device as well as a speed/direction estimate a moving vehicle associated therewith, it can be anticipated as to where and when the vehicle and its UE device will encounter radio white spots over a projected route and/or duration of time by querying a suitable video outage database. Hereinafter, the terms "vehicle" and "wireless UE device" operating therein will be used somewhat interchangeably for purposes of the example embodiments unless otherwise expressly noted. Furthermore, it shall be apparent that the vehicle with which an ABR streaming-capable UE device is associated may comprise any public or private transportation means, e.g., cars, trucks, two-wheelers, buses, trains, etc. As will be set forth in further detail below, appropriate ad segments may be preloaded or otherwise pushed to the UE device that are specific to the video outage area and/or demographic profile of the user.

Thereafter, upon ascertaining that the wireless UE device is in a radio white spot area, a further determination may be made to time-shift the current ABR live media streaming session of the wireless UE device (block 304). Such time-shifting may take place immediately or at some other relevant point with respect to the media segments being streamed, e.g., upon completion of a current media segment. Further, the ABR client of the wireless UE device may be instructed to commence playback of other content preloaded into a local cache or otherwise buffered at the wireless UE device while the ABR streaming session is in a time-shifted mode. As noted above, the locally available alternative content and its amount may preferably comprise advertisement content that may be relevant with respect to (i) the video outage area that the wireless UE device is in; (ii) user profile and/or demographic information of the wireless UE device user; (iii) the user's estimated travel route passing through the video outage area; (iv) the content type or subject matter of the particular ABR live media, and/or some other user- or network-specified information identified for preloading, etc., in any combination thereof. The amount of such alternative content available for playback or play-out may be predetermined based on the estimated time it may take for the vehicle/UE device to traverse a particular video outage area. In one arrangement, the preloaded advertisement content may be pushed to the wireless UE device prior to the device entering the video outage area, which may comprise one or more targeted local, regional and/or national advertisement segments based on a number of factors. At some future time, based on determining that the wireless UE device is exiting the video outage area or lapse of a known estimate of time required to traverse the video outage area, the time-shifted ABR streaming session may be (re)commenced or resumed from the point where it was suspended (e.g., from a media segment adjacent to the particular segment that was last played), as set forth at blocks 306 and 308.

Reference numeral 300B in FIG. 3B generally refers to at least a portion of additional features and associated blocks that may be added, replaced, or supplemented, either alone or in any combination, in respect of the white spot area coverage process 300A described above. As one skilled in the art will appreciate, ABR streaming techniques allow for streaming of content encoded at varying bitrates, depending upon, inter alia, network bandwidth conditions, client resources, radio signal quality, etc. For example, a user's bandwidth and processing capacity may be detected in real time, and the quality of video stream may be adjusted accordingly. Initially, source content is transcoded or otherwise encoded with different bit rates (e.g., multi-rate transcoding). For example, a particular content may be transcoded into five video files using variable bit rates, ranging from low to high bit rates. The particular content is therefore encoded as five different "versions" or "formats", wherein each bit rate is called a profile or representation. The encoded content is divided into fixed duration segments or chunks, which are typically between two and ten seconds in duration. Whereas shorter segments may reduce coding efficiency, larger segments may impact the adaptability to changes in network throughput, radio conditions, and/or fast changing client behavior. Regardless of the chunk size, the segments may be Group-of-Pictures (GOP)-aligned such that all encoding profiles have the same segments. A suitable Manifest File is created that describes the encoding rates and includes Universal Resource Locator (URL) pointers relative to the various segments of encoded content. In one implementation, the Manifest File (MF), a Delivery Format (DF) and means for conversion from/to existing File Formats (FF) and Transport Streams (TS) may be provided to a client device when a particular content is requested, which uses HTTP to fetch the encoded segments from the content provider network, provided there is no bandwidth conflict and/or radio signal deterioration. The received segments may be buffered, as needed, and decoded and played back (i.e., rendered) in sequence by the ABR client running on a UE. In the context of MPEG-DASH streaming, manifest file information may be provided in one or more hierarchically-organized metadata structures referred to as Media Presentation Description (MPD) files (more generally, media presentation data structures). Broadly, an MPD structure is an Extensible Markup Language (XML) document that describes segment information (timing, absolute/relative URLs, media characteristics such as video resolution and bitrates).

Accordingly, by virtue of the manifest file information, the ABR client is made aware of the available streams at different bitrates, and segments of the streams, whereby the client can switch between streaming the different encoded segments depending on available network resources. For example, when the network throughput has deteriorated, e.g., as a wireless UE device approaches a video outage area, the ABR client may find that the download speed for a currently-downloaded segment is lower than the bit rate (or, synonymously "bitrate") specified for that segment in the manifest file. In that event, the client may request that the next segment be at that lower bitrate. Similarly, if the client finds that the download speed of the currently-downloaded segment is greater than the manifest file-specified bitrate of the segment downloaded, then the client may request that next segments be at that higher bitrate. Therefore, it should be recognized that an ABR buffer may contain requested media segments at different video qualities (e.g., lower bitrate content having a lower quality versus higher bitrate content having a correspondingly higher quality). Accordingly, before determining to time-shift an ongoing ABR live media streaming session due to, for example, encountering a video outage area, a decision may be made to continue to play back the lower bitrate media segments that have been previously downloaded into the ABR buffer (block 352). Playback of such lower bitrate content may take place until the ABR buffer is completely exhausted or, if the buffer has stored progressively lower quality segments, upon reaching a certain minimum threshold quality acceptable to the user. Further, either upon exhausting the buffer or reaching the quality threshold, one or more notifications may be provided to the user that the wireless UE client device is entering or has entered an outage area and/or the video quality is unacceptable. The notifications may also indicate that the current ABR live media streaming session is being time-shifted (e.g., for a certain estimated duration) and alternative content (e.g., advertisements) may be played back instead (block 354). Similarly, when the wireless UE client device is exiting or out of a radio white spot, appropriate messages may be provided with respect to resuming the time-shifted ABR live media streaming session (block 356).

FIG. 3C depicts still further additional features and associated blocks that may be added, rearranged, modified, or supplemented, either alone or in any combination, in respect of the processes set forth in FIGS. 3A and 3B. Block 372 refers to features relating to pre-populating or preloading alternative/advertisement content into a wireless UE device when the radio conditions of a wireless network permit. As illustrated, parameters such as signal-to-noise (S/N) ratio, interference levels, and other channel conditions may be monitored or determined to be such that the signal quality may be sufficiently high, thereby permitting streaming/downloading of alternative content, e.g., advertisements, from appropriate content sources (e.g., an advertisement campaign server) in addition to streaming of any requested content at a sufficient quality. Rather than playing back the alternative content immediately, it may be stored in a local cache (e.g., different from the ABR client's buffer). In one embodiment, when the wireless UE device is in a known white spot area, appropriate content is moved from the local cache into the ABR buffer for playback, which may be triggered responsive to network-based messaging or UE device determination (block 374). Thereafter, the alternative content is played out from the ABR buffer based on modified manifest files that reference to the internal cache location (block 376).

It should be appreciated that the foregoing blocks, steps and/or acts of FIGS. 3A-3C may be arranged or re-arranged in several combinations, which may be executed at different locations or at co-located network elements or nodes within a wireless network environment such as the example network environment 100 illustrated in FIG. 1. Further, time-shifting of live media and advertisement preloading may be at least partially implemented in a network-controlled arrangement involving a generic ABR client) or in a client-centric configuration (e.g., for a client-controlled implementation involving a custom ABR client), depending on where some of the foregoing blocks, steps and/or acts may take place. Additional details with respect to one or more of such embodiments may be exemplified in view of the following Figures described below.

Generally, in a normal, fully connected radio area of the wireless network environment of FIG. 1, there is bandwidth enough to both pre-cache advertisement clips as well as watch live content simultaneously. It should therefore be appreciated that an embodiment of the present invention may be implemented without substantial modifications at the end-user side to make the wireless UE device ready for white spot advertisements (i.e., "priming" of the UE device). According to an implementation, the advertisements may be cached just once in the UE device, so that only updated clips need to be downloaded when they are released to the video service subscribers. This means that the ad clips (and any updates) need less data than the normal video, since each advertisement clip can be cached once and played back several times. Accordingly, compared to how normal advertisements are provided in wired networks (e.g., cable TV networks), it should be appreciated that an ad playback arrangement of the present invention facilitates a better situation for the end-user, the operator and the content provider in an ABR live media streaming environment (e.g., in terms of bandwidth savings, optimized network resources, overall quality, etc.).

As noted previously, redirection to locally stored ad content (i.e., on the device) can be facilitated in a network-controlled manner in one configuration. In such an arrangement, when an network node, e.g., a ABR video delivery server disposed in an access network arrangement or as a virtual function in a cloud implementation, determines when the client device is in an outage area, it requests for a time-shift subsystem (which could be at an access/core network, CDN, or even at a cloud platform) to begin recording the live content for the client's live media streaming session. The live session may therefore be referred to as a time-shifted session during or after an outage area in one example implementation. The network node may also be configured to dynamically adjust the manifest URLs to reference the stored buffer locations inside the ABR client device where the ads have been stored. In addition, a persistent connection can be maintained in a number of ways as will be described in detail below to keep the live session alive. For instance, if the time-shift system begins storing segments at an RNC node and maintains a time-shift manifest, the live session's starting/resuming point for the session may also be maintained thereat. In an example arrangement, session states for maintaining persistent connections with the ABR clients may be identified using the International Mobile Equipment Identity (IMEI), International Mobile Subscriber Identity (IMSI), mobile identification number (MIN), electronic serial number (ESN), MAC address or any other unique identifiers associated with the consumer/subscriber devices. Preferably, a live video session ID associated with the streaming session may be maintained to be satisfactory as long as the time-shift system keeps the session alive and stores the time-shifted media/manifests mapped to the session ID. Once the client device is outside of the ABR live video outage area, the manifest is adjusted to the next segment beyond the last segment delivered to the client at live video outage time, allowing the client to resume playback from the last live video segment played prior to entering the outage area.

Figure 4:
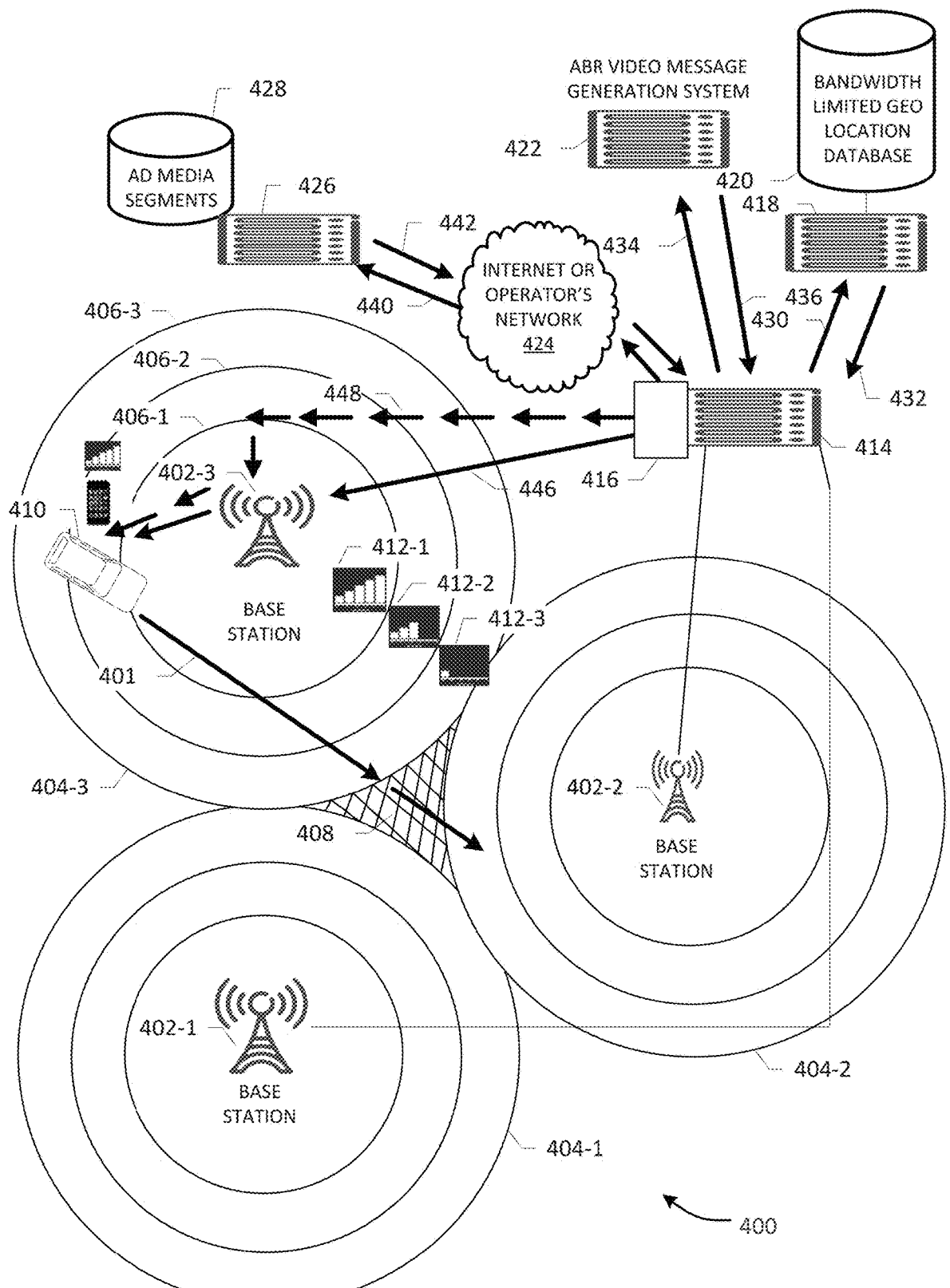
FIGS. 4-10 depict additional details with respect to an example wireless network environment configured to support ABR live media streaming and associated methods relating to video white spot coverage in accordance with one or more embodiments of the present patent disclosure.
Figure 5:
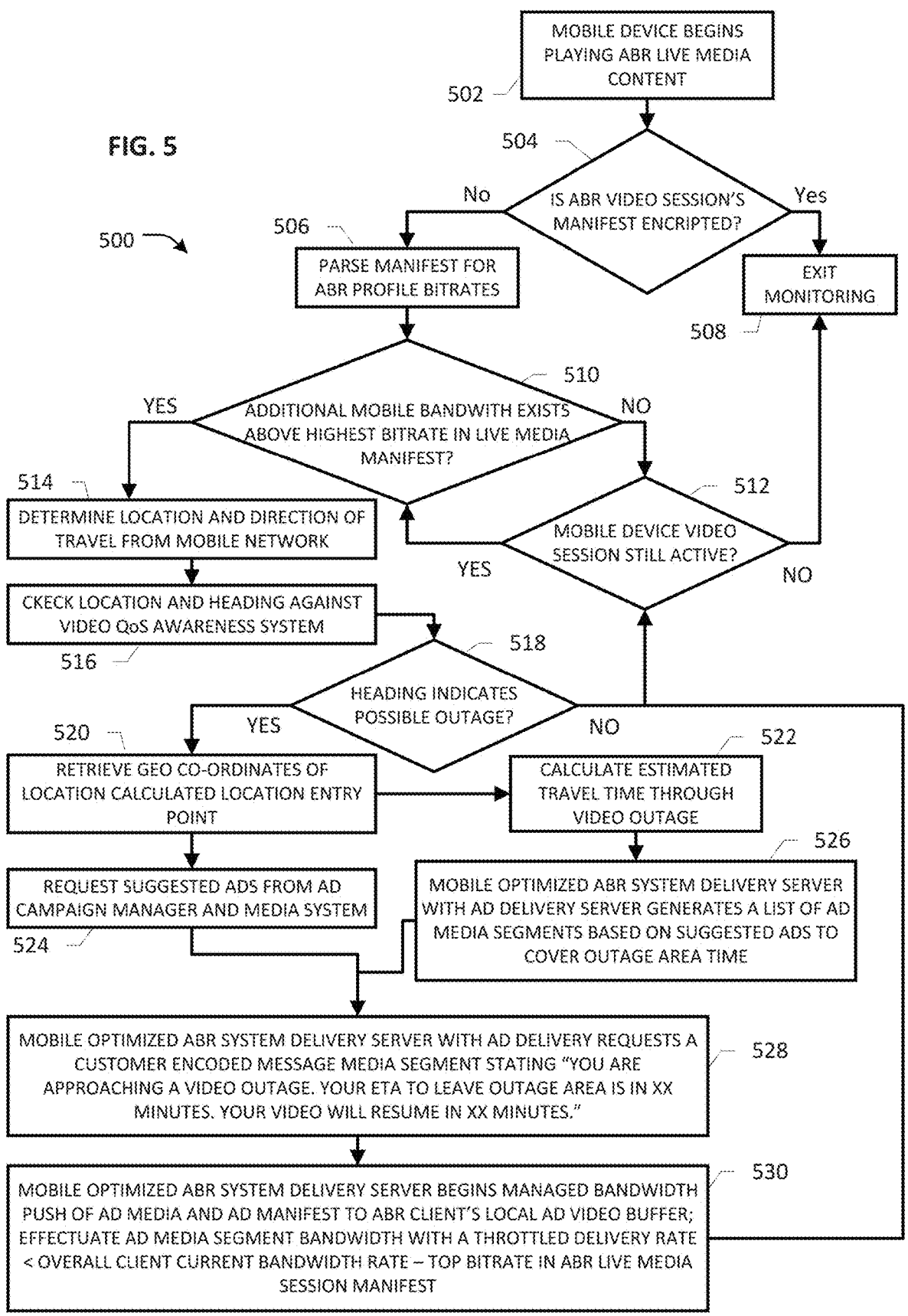
Figure 6:
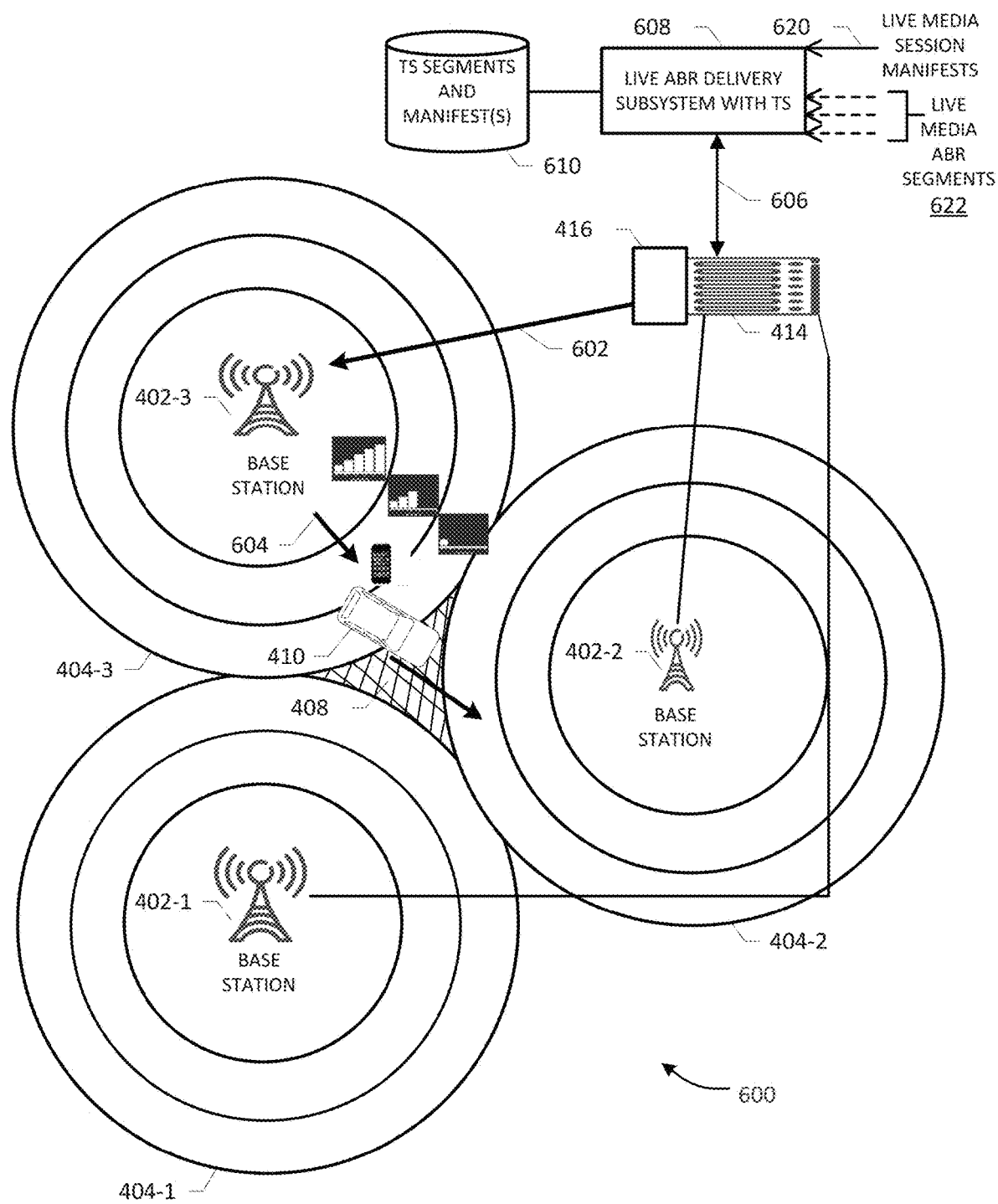
Figure 7A:
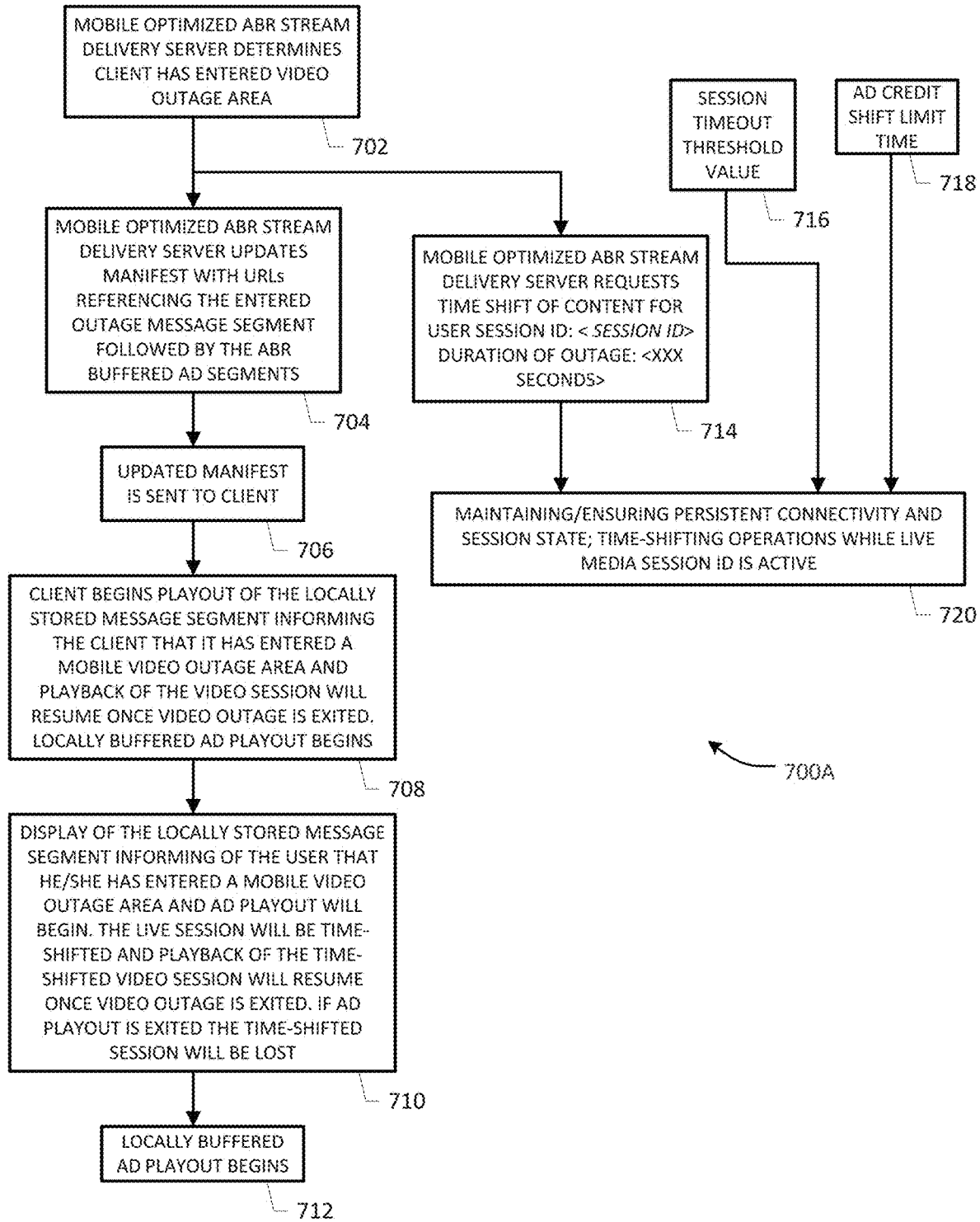
Figure 7B:
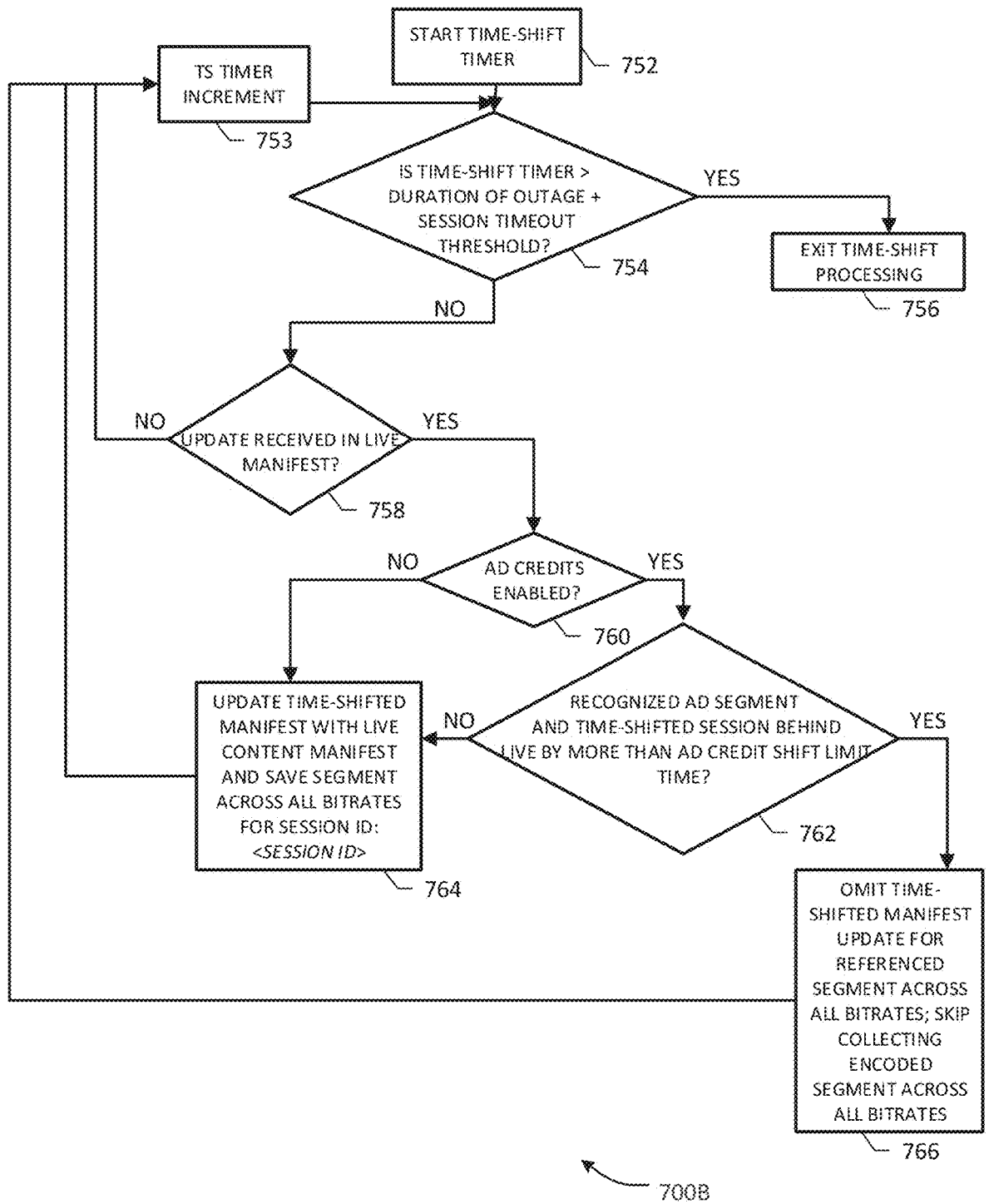
Figure 7C:
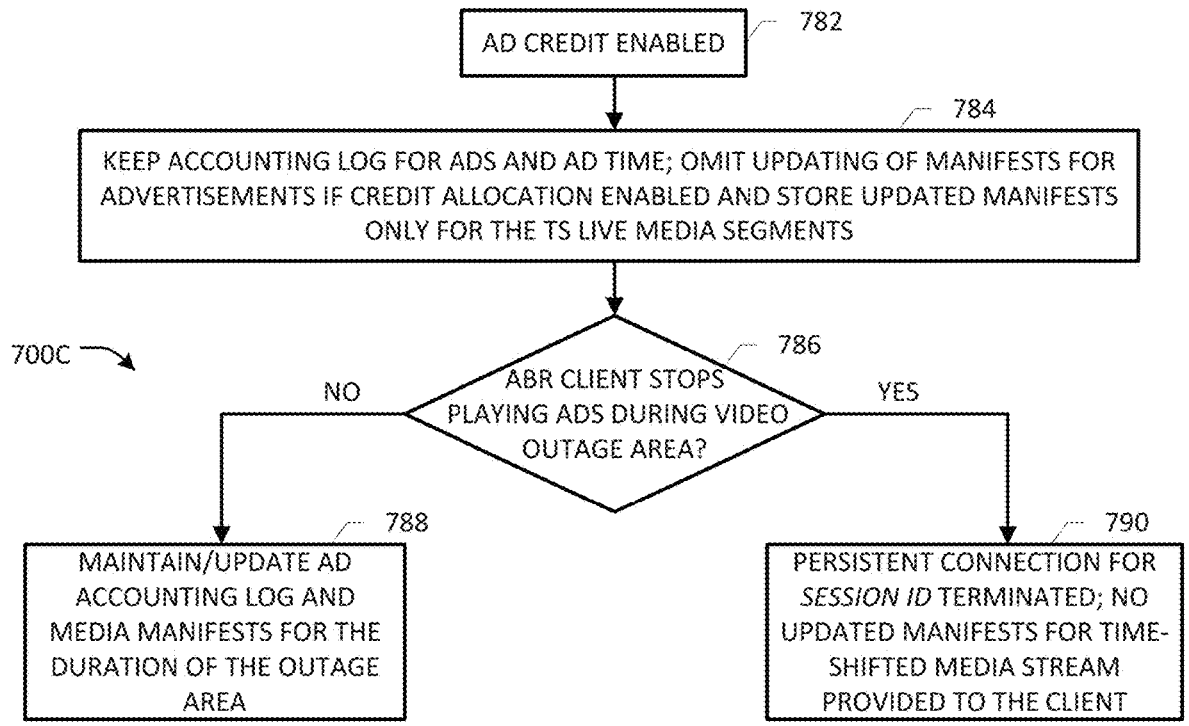
Figure 7D:
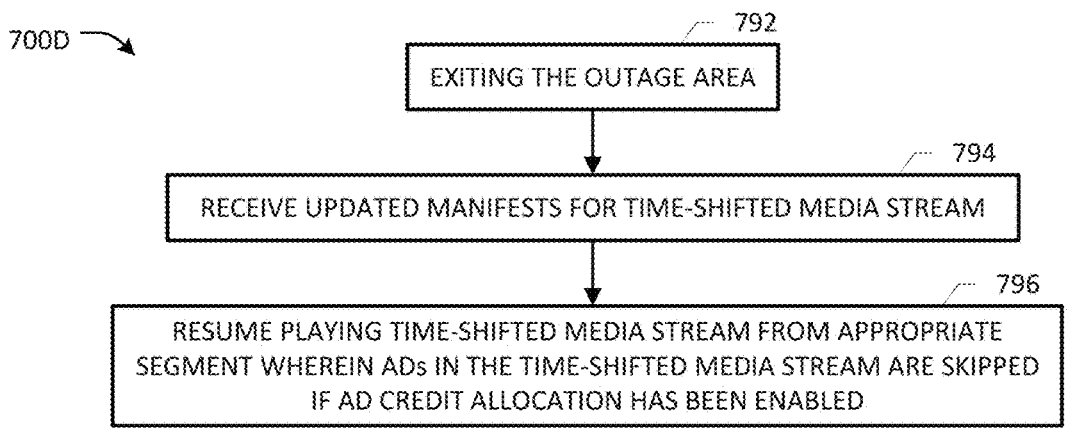
Figure 8:
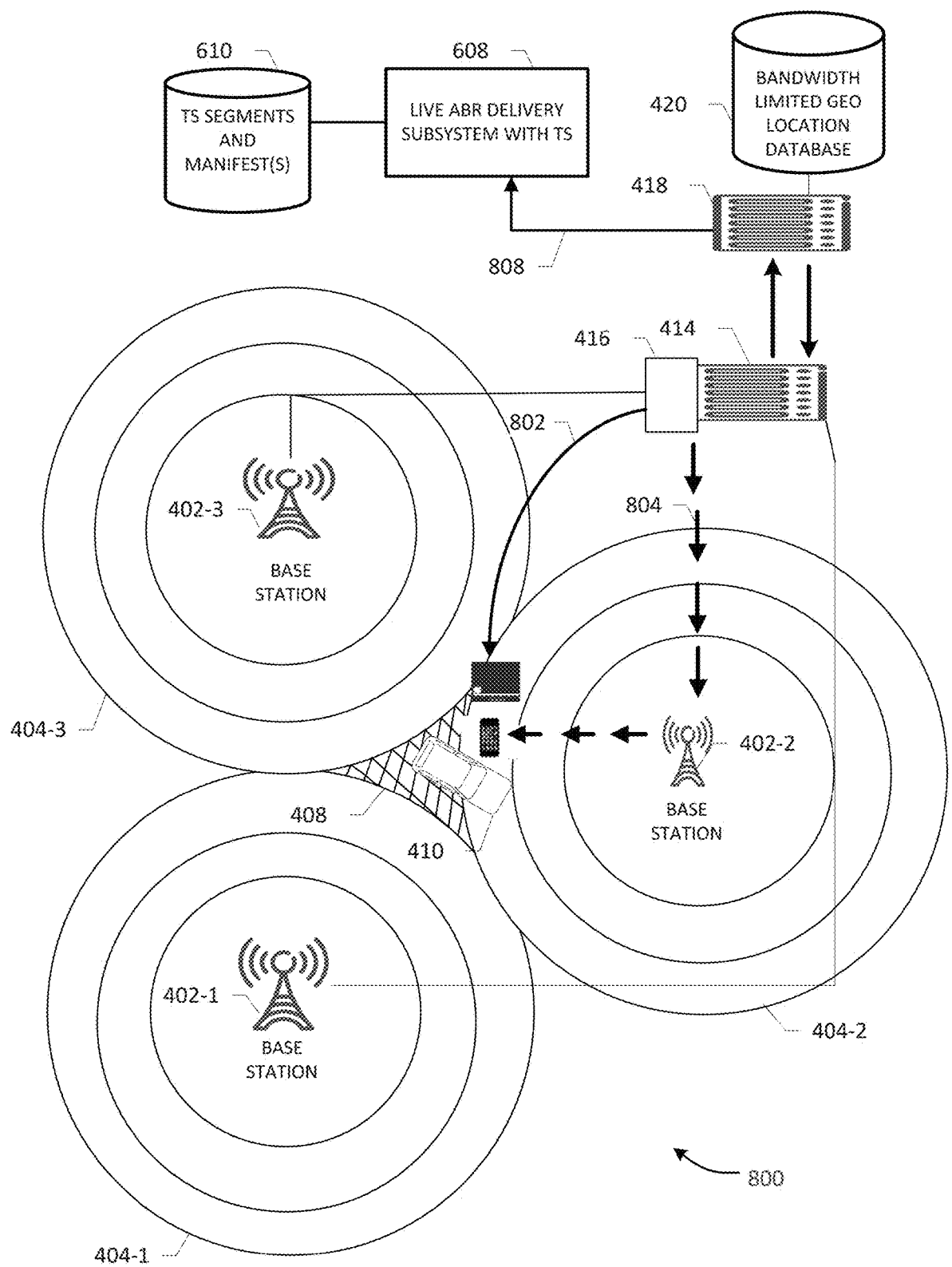
Figure 9:
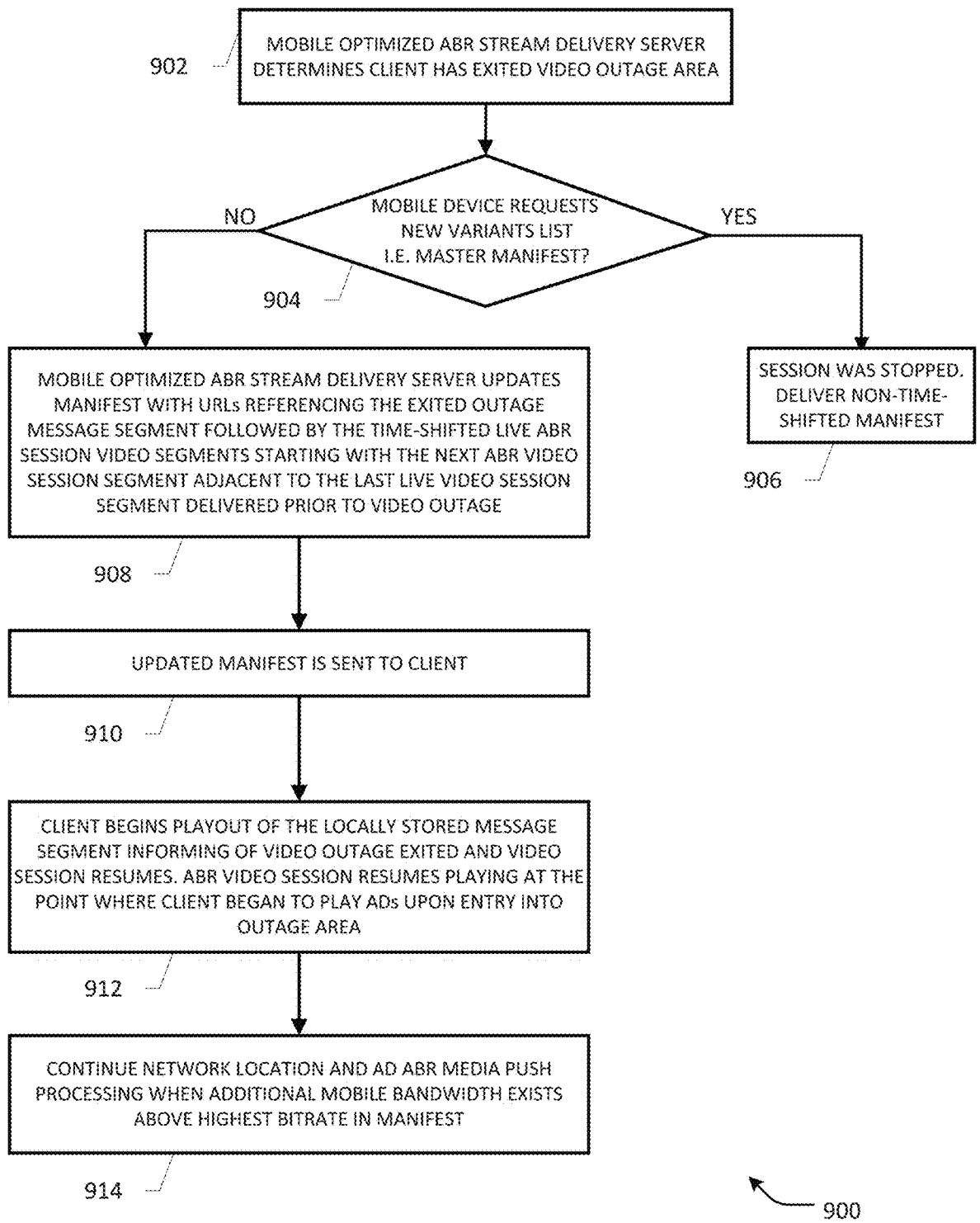
Figure 10:
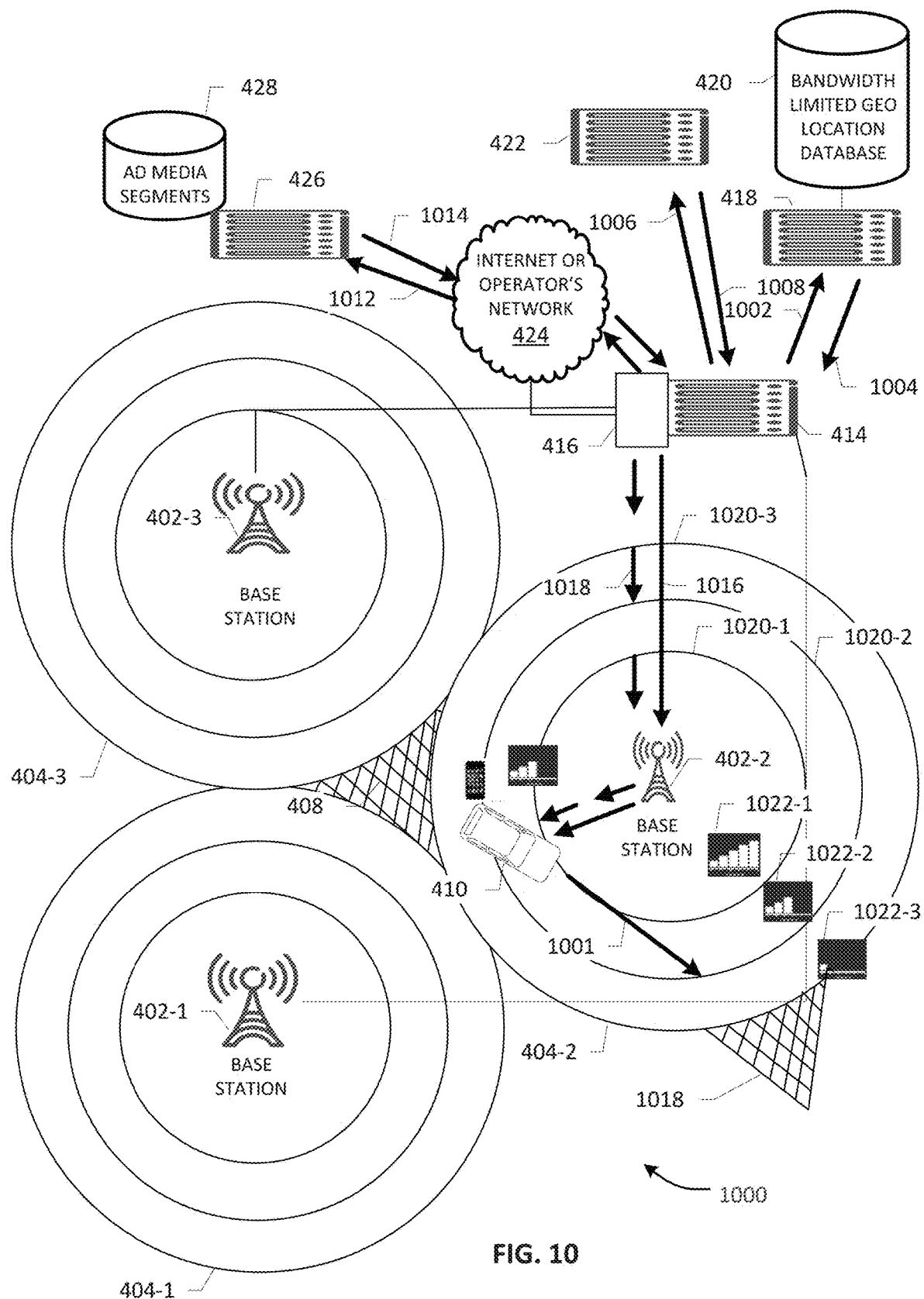

FIGS. 4-10 depict additional details with respect to an example wireless network environment configured to support ABR live media streaming and associated methods according to a network-controlled implementation of the present patent disclosure wherein a generic or legacy ABR client or device is operative for consuming content. Specifically, FIGS. 4 and 5 depict a wireless network environment 400 and associated processing 500 for effectuating network-controlled pre-caching or pre-populating advertisement content in a wireless UE device having an ABR client application and disposed in or otherwise associated with a vehicle, collectively referred to by reference numeral 410. FIG. 6 depicts a portion 600 of the network environment 400 wherein an advertisement play out process 700A may be practiced according to the embodiment shown in FIG. 7A. FIG. 7B depicts a flowchart for maintaining connection persistency and credit allocation for advertisements according to an example embodiment. FIGS. 7C and 7D depict flowcharts relating to additional processes that may be combined or intermixed with other flowcharts of the present patent application. FIG. 8 depicts a portion 800 of the network environment 400 wherein an ABR streaming session resumption process 900 may be practiced for starting playback of time-shifted media according to the embodiment shown in FIG. 9. FIG. 10 depicts another network rendition 1000 corresponding to the network environment 400 wherein location-specific advertisements may be pre-cached as the wireless UE device is anticipated to encounter another outage area of the network.

Taking reference to FIG. 4, the example wireless environment 400 is illustratively shown as comprising a plurality of coverage areas, e.g., areas 404-1 to 404-3, effectuated by appropriate wireless network infrastructure elements, e.g., base stations 402-1 to 402-3, corresponding thereto. As is known in the art, a radio coverage area by a base station may take any shape and include varying levels of signal quality and strength, wherein there may be some coverage gap depending on a number of factors. Illustratively, coverage areas 404-1 to 404-3 are exemplified as circular regions, each having a plurality of concentric signal quality/strength contours. By way of example, coverage area 404-3 is shown to include three such contours 406-1 to 406-3, each depicted with a respective signal level indicator icon, 412-1 to 412-3, respectively. Contour 406-1 having the highest signal quality is closest to base station 402-3, whereas contours 406-2 and 406-3 are spaced further away from the base station, with progressively deteriorating signal quality (i.e., strength, level, etc.). A radio white spot area or video outage area 408, which may take any shape, is illustratively shown as being disposed where the three coverage areas 404-1 to 404-3 come together. A UE-carrying vehicle 410 is illustratively shown as traversing from coverage area 404-3 to coverage 404-2, potentially via a path or route 401 that may traverse the video outage area 408.

To facilitate ABR live media streaming and advertisement pushing, a number of network nodes or elements may be configured to interface with or otherwise be included as part of the wireless network environment. A mobile-optimized ABR stream delivery server 414, which may be provided as part of a network controller node (e.g., an RNC) or as a virtualized function at a cloud provider, is configured to deliver ABR live media content to wireless UE devices via respective sessions established through the serving base stations of the wireless network environment, wherein the content being delivered may originate from any number of live content sources and/or may involve appropriate CDN infrastructure elements (not shown in FIG. 4). Accordingly, at least in one embodiment, the ABR stream delivery server 414 may be provided with appropriate radio interfaces with respect to the serving base stations and may be configured to maintain/monitor UE devices' real-time mobile sessions. The ABR stream delivery server 414 may also interface with a video quality location awareness server 418 and associated geo-location database 420 having relevant video outage information. In one implementation, such a database may be developed using a learning process described above with respect to FIG. 2, which may be augmented with additional features set forth in one or more of the commonly owned patent applications incorporated by reference elsewhere in this patent application. A Segment Encoding and User Session Segment Delivery and Ad Content Push control module 416 (also referred to as a "delivery module" or "delivery control module" herein) may monitor delivery bitrate/bandwidth for the streaming content delivered by the ABR stream delivery server 414 as well as effectuate the delivery of alternative content (e.g., advertisements) as will be discussed in more detail below. In one embodiment, the delivery module 416 may be integrated as part of the ABR stream delivery server 414 which may be configured to provide manifest files for the ad content to the UE devices in addition to media segments delivered to the UEs pursuant to respective ABR live media streaming sessions. The ABR stream delivery server 414 and/or associated delivery control module 416 may therefore be interfaced, in one embodiment, with a suitable advertisement campaign management and media system 426 having a advertisement media segment database 428, for access via a public packet-switched network such as the Internet or an operator network, cumulatively referred to by reference numeral 424.

The ABR stream delivery server 414 and/or associated delivery control module 416 may also be interfaced, in a network-controlled implementation, to a video message generation system 422 for generating and providing appropriate notifications and/or messages to the wireless UEs as they enter or approach and/or exit a video outage area. In one embodiment, such notification messages may comprise a video-encoded still image of a message (text, graphics, etc.) configured to apprise the user of any information relevant with respect to the streaming session, e.g., to the effect that an outage has occurred and/or advertisement content may be played in lieu of current live media streaming session. Such service outage message notifications may also include relevant timing durations, e.g., how long a service outage may last, or some predetermined time window, for instance. The video-encoded still image, which may be encoded at a low bitrate, may be provided or otherwise delivered to the UE devices when the radio conditions permit (i.e., having sufficient bandwidth while continuing to effectuate the ABR live streaming sessions), using suitable manifest files and/or redirection techniques as set forth in additional detail in one or more of the following commonly owned co-pending U.S. patent application(s): (i) "CONFLICT DETECTION AND RESOLUTION IN AN ABR NETWORK", application Ser.

No. 14/194,868, filed Mar. 3, 2014, in the name(s) of Christopher Phillips et al., published as US 2015/0249622; and (ii) "CONFLICT DETECTION AND RESOLUTION IN AN ABR NETWORK USING CLIENT INTERACTIVITY", application Ser. No. 14/194,918, filed Mar. 3, 2014, in the name(s) of Christopher Phillips et al., published as US 2015/0249623, hereby incorporated by reference herein.

Turning to FIG. 5, an advertisement content push process 500 in a network-controlled implementation may now be described in conjunction with the network arrangement of FIG. 4. In a normal streaming operation (e.g., under suitable radio conditions supportive of sufficient bandwidth), the UE device 410 is engaged in receiving high bitrate live ABR media segments (e.g., 2 Mbs segments) and associated manifests via its serving base station 402-3 shown in FIG. 4 as an ABR live media streaming session 448 (block 502). A suitable network entity, e.g., the ABR stream delivery server 414 and/or associated delivery control module 416 may initially determine if the ABR streaming session's manifest is encrypted (block 504). If so, no further monitoring takes place and the processing for pre-population of advertisement content may subsequently terminate (block 508). If the manifest file is not encrypted, the network entity may parse the manifest file for ABR profiles (block 506), i.e., the media segment bitrates specified in the manifest file for the current ABR live media streaming session. A determination may be made whether the overall bandwidth of the wireless UE device 410 exceeds a particular bitrate quality, e.g., a highest bitrate indicated in the live media manifest file, that is, if there exists additional mobile bandwidth over and above the bandwidth necessary to support pulling the media segments with the highest bitrate specified in the manifest file (block 510). If not, a further determination may be made to verify whether the video session of the wireless/mobile UE device 410 is still active (block 512). If it is determined that the wireless UE device's video session is not active, further monitoring and processing for pre-population of advertisement content may be terminated or otherwise exited (block 508). On the other hand, if it is determined that the wireless UE device's video session is active, the process flow may loop back to checking again whether there exists additional bandwidth (block 510). In one variation, such a process loop may involve waiting for a certain period of time before re-determining additional bandwidth availability.

If there is additional bandwidth as determined at block 510, a further determination may be made to determine at least one of a location and direction of travel associated with the UE-carrying vehicle 410 (block 514). As explained previously, such a determination may be effectuated using any known or heretofore unknown location techniques available with respect to the wireless network environment 400 depending on its radio technology implementation. Thereafter, one or more determinations may be made as to whether the UE-carrying vehicle 410 is headed in a direction likely to encounter a video outage area (i.e., a radio white spot), and if so, what its coordinates are and how long it will take to traverse through it, which determinations/decisions and associated calculations may be effectuated by way of one or more request/response mechanisms with respect to the video quality location awareness server 418 and associated geo-location database 420 having relevant video outage information, as set forth at blocks 516, 518, 520 and 522. Illustratively, a request/query 430 to the video quality location awareness server 418 may comprise:

Request anticipated Video Outage;
Location: Client Location: 19.9423 Deg North; 155.9985 Deg West;
Heading: 110 Deg East;
Speed: 60 mph Responsive thereto, the video quality location awareness server 418 may provide a response 432 that comprises the following with respect to the travel path 401:

Response;
Outage Begin 19.0323 Deg North; 155.0012 Deg West;
Interval: 5 min 30 Sec In one arrangement, the video quality location awareness server 418 and/or its associated database 420 may be provided at an RNC node or may be virtualized at a cloud-based node. Regardless of how or where the video quality location awareness is implemented, if the current heading is determined to indicate no upcoming outage, further monitoring and processing for pre-population of advertisement content may be terminated, provided the live media streaming session is not active as set forth before (blocks 512, 508). Otherwise, upon obtaining location coordinates of the video outage area and calculating estimated travel time through video outage (blocks 520, 522), one or more request/response mechanisms may be carried out with respect to the alternative content server/system 426 and associated ad media segment database 428 via network 424 for obtaining suggested advertisements that cover the outage area time (blocks 524, 526). In FIG. 4, such interactions are illustratively shown as a request/response mechanism, wherein an example request/query 440 may include the following input:

Calculated Outage Location;
Location: Client Location: 19.0323 Deg North; 155.0012 Deg West;
User Demographic Information: Age, Gender, Etc.

Responsive thereto, an example response 442 may include the following information:

6 advertisement clips/segments;
(Location-specific and/or User-specific);
Total time=Calculated Video Outage Interval of 5 min 30 Sec Further, the ABR stream delivery server 414 and/or associated delivery control module 416 may effectuate additional request/response mechanisms, e.g., request 434 and response 436, with respect to the video message generation system 422 for generating/obtaining one or more custom message segments, e.g., a customer message stating: "You are approaching a video outage or in an area of low quality. Your ETA to leave outage area is xx minutes. Your Video will resume in xx minutes" (block 528). Thereafter, the network entity 414/416 may commence managed bandwidth push of advertisement media segment(s) and associated manifest(s) as well as the custom message notification(s) and associated manifest(s) to the wireless UE device 410 with a throttled delivery rate based on an amount by which the device's overall bandwidth exceeds the highest bitrate indicated in the manifest file of the current ABR streaming session (block 530), which is illustratively shown in FIG. 4 as ad media and message push path 446 to the serving base station 402-3.

Referring now to FIG. 6, depicted therein is a portion 600 of the network environment 400 described above in detail. It should be recognized that at least certain portions of the description of FIG. 4 are equally applicable with respect to the wireless network environment portion 600, mutatis mutandis, wherein an advertisement play out process 700A may be practiced according to an embodiment shown in FIG. 7A. As the UE-carrying vehicle 410 continues to travel towards coverage area 404-2 served by the base station 402-2, it begins to experience progressively lower quality radio coverage locations of the coverage area 404-3 before entering the video outage area 408. Pursuant to such signal deterioration and/or other methods of localization described herein, the ABR stream delivery server 414 and/or associated delivery control module 416 may determine that the UE-carrying vehicle or client 410 has encountered a loss of video coverage area (block 702). Responsive thereto, service logic provided at the ABR stream delivery server 414 and/or associated delivery control module 416 is operative in one embodiment to update or otherwise modify location pointers of the ABR live media streaming session to be replaced by the pointers associated with the pre-populated user/location-specific ad content and/or custom message notifications that reference the wireless UE device's internal or local cache where such content was downloaded and stored. That is, the manifest URLs that would have pointed to locations elsewhere in the network with respect to the ABR live media segments are replaced with URLs that point to a local storage file path, the implementation of which may depend on the device's software (i.e., operating system or other control software), which are then transmitted to the wireless UE device 410 (blocks 704, 706). It should be appreciated that although the radio signal quality may be less than desirable or sufficient for purposes of ABR streaming of live media content, the wireless UE device 410 may continue to be in radio communication with one or more base stations, e.g., 402-1 to 402-3, as it approaches/enters any white spots along the way, which may be adequate for sending the updated manifest files via any suitable means. In FIG. 6, a path 602 is illustrative of transmission of updated manifests to base station 402-3 that contain pointers to the content (cached at the wireless UE device 410) whose playback is estimated or otherwise calculated to take up the time required to traverse the video outage area 408. In one implementation, the updated manifest file(s) may contain URLs that take on a form such as, e.g., file://<filename and path to segment>, depending on the device software. In some implementations, the device software may not allow accessing such internal references by the ABR client application executing thereon. In such a scenario, a local HTTP server functionality may be provided as part of the wireless UE device's software architecture, whereby updated manifests may accordingly include URLs pointing to the local HTTP server in a manner that is more acceptable. For example, an illustrative URL referencing local HTTP server may take on the form: http://127.0.0.1/message/. Additional subject matter relative to manipulation, updating or modification of URLs and/or manifest files may be found in one or more of the following commonly owned co-pending U.S. patent application(s): (i) "TIME-SENSITIVE CONTENT MANIPULATION IN ADAPTIVE STREAMING BUFFER", application Ser. No. 14/179,876, filed Feb. 13, 2014, in the name(s) of Jennifer Reynolds et al., issued as U.S. Pat. No. 9,210,207, hereby incorporated by reference herein.

Responsive to receiving the updated manifest files, the ABR client application executing on the wireless UE device is operative to play out the locally stored message segment (e.g., video-encoded still image of a text to the effect that it has entered a video outage area and playback of the video session will resume once the video outage area is exited). After the notification message playback, the ABR client application may commence playback of the locally stored advertisement content based on the sequence of associated manifest URLs as set forth at block 708. Such notification messages may be rendered and displayed via a suitable display to the user. Additional messaging may also follow to inform the user that the ABR live media streaming session is being time-shifted (e.g., for an estimated duration of time) and will be resumed once the video outage area is exited, as noted previously. Optionally, another message may be provided to the user informing that if ad playout is exited, the time-shifted session will be lost, with the possibility that a portion of the live media will not be available for playback when the streaming session is resumed, as set forth at block 710. After suitable service outage notifications, messages and alerts, etc., as set forth above, locally buffered ad segments may be played out, which may involve moving the ad segments from a local cache to an ABR buffer that the ABR client application accesses (block 712).

Also, responsive to the determination that the wireless UE device executing the ABR client application has entered the video outage area, a request 606 may be caused to be transmitted to a live ABR delivery subsystem having time-shift (TS) functionality 608 (shown in FIG. 6). Preferably, the live ABR delivery/TS subsystem 608 may be configured to effectuate one or more ABR live media streaming sessions in conjunction with the mobile-optimized ABR stream delivery server 414. Accordingly, the live ABR delivery subsystem 608 may be provided with suitable interfaces for receiving live media segments encoded at different bitrates 622 and associated live media manifests 620 with respect to each of the ABR live media streaming sessions from one or more upstream live media sources or server nodes. A database 610 associated with the live ABR delivery subsystem 608 may be configured to store manifests, time-shifted segments for all bitrates for each time-shifted session that may be identified by a unique session identifier associated therewith, which may be maintained for configurable time durations for performing suitable time-shifting operations as will be set forth below.

Continuing to refer to FIG. 7A, block 714 is illustrative of a request 606 for time-shifting a particular streaming session, which may be initiated responsive to the determination that the wireless UE/ABR client has entered the video outage area. As noted at block 714, such a request may include the user session identity <session id> as well as an outage duration indication in seconds, for example. Responsive to the request 606 as well as additional input parameters comprising, e.g., a session timeout threshold or ceiling value 716 and an ad credit shift limit value 718, various processes and/or sub-processes may be executed at one or more nodes or cloud-based virtual functions for maintaining the session in an active state, i.e., connection persistency, enabling credit allocation for advertisements and related time-shifting operations, collectively shown at block 720.

FIG. 7B depicts various operations, actions and blocks that may take place at least in some combinations as a process 700B for performing or causing to perform while a live media session ID is maintained to be active. One skilled in the art will recognize that live media sessions (and server connections therefor) may be maintained using a number of techniques. In one embodiment, a session/connection timeout parameter may be provided as input (e.g., session timeout threshold value 716) to a decision process to determine for how long TS operations need to be executed, which decision process may be modulated depending on the estimated outage duration as well as any configurable guard bands, as exemplified by a time-shift timer 752 and decision block 754. In another arrangement, a session proxy server may be provided to maintain the connection state associated with an ABR live media session. In still further arrangements, a combination of techniques may be provided to maintain the session in a persistent manner. Regardless of how a live media session is kept alive during the outage area traversal, an embodiment of the present invention may be advantageously configured to provide suitable request/response messages to upstream media server(s) so that they do not time out and continue to transmit the live media (including any inserted ad segments) and associated manifests as they keep getting updated pursuant to the passage of live programming in real-time.

If the TS timer is greater than the outage duration and a configurable guard band (decision block 754), TS processing may be terminated (block 756), e.g., because the wireless UE device may have exited the outage area and there is accordingly no need for continuing to time-shift. Otherwise, the live media segments and any ad segments of the media stream continue to be time-shifted. If an updated live manifest is received (block 758), a further determination is made as to whether ad credit allocation is enabled (block 760). If the ad credit allocation is not enabled, segments for the entire media stream, live program segments and ad segments, are time-shifted. Accordingly, time-shifted manifest(s) for the live content and the content segments are stored across all ABR bitrates for the particular time-shifted streaming session ID (block 764). To ensure that no extra credit is given to the ads (e.g., where a subscriber watches more ads during an outage period than were present in the time-shifted ABR live media streaming session), another decision process 762 may be executed based on the ad credit shift time limit parameter 718. If a recognized ad segment (i.e., the ad credit allocation is enabled) and the time-shifted session is behind the live media time by more than the ad credit shift time limit (block 762), time-shifted manifest and the referenced segment are omitted (i.e., no updating) and the referenced segments across all bitrates are skipped (i.e., no storage), as set forth in block 766. As illustrated in FIG. 7B, the foregoing TS operations are looped through a TS timer increment 753 to facilitate execution while the live session ID is active.

FIGS. 7C and 7D depict flowcharts relating to additional processes and/or sub-processes that may be combined or intermixed with other flowcharts of the present patent application in different embodiments, including client-assisted TS operations and ad playout embodiments set forth further below. In relation to process 700C, ad credit allocation may be enabled at block 782, e.g., in a manner set forth above. An accounting log for crediting ads and ad run time may be maintained, wherein updating of manifests for advertisements is omitted if credit allocation enabled. Accordingly, updated manifests may be stored only for the TS live media segments where the ad credits are enabled for the entire outage duration. These operations are set forth at block 784. According to one example embodiment of the present invention, if the ABR client stops playing the cached ads during video outage area (block 786), the live ABR streaming session having Session ID is terminated (block 790). In such a scenario, no updated manifests for TS media stream may be maintained or provided to the ABR client. In one variation, whatever TS program media and ad segments may have been stored, the system may be configured to discard such data as well. On the other hand, the ad accounting log may continue to be maintained or updated, along with TS manifests for the media segments while it is determined that the ABR client has not stopped playing the cached ads during the outage (block 788). An example process 700D relating to exiting an outage area is depicted in FIG. 7D. As the ABR client/device exits the outage area, updated manifests for the TS media may be provided to and received by the ABR client/device via the serving RAN infrastructure (block 794). Responsive to the updated manifests, the ABR client/device resumes playing the TS media segments, wherein the ads in the TS media stream are skipped if the ad credit allocation has been enabled (block 796).

In a still further embodiment, it will be realized that in some arrangements a service provider or content provider may implement time-shifting of live programming, e.g., for enabling features such as Catchup TV, Start Over, Scrolling Back, etc. Accordingly, an additional or alternative variation of the present invention may involve modulating video outage based TS operations and ad playout as set forth herein by taking into account a service provider's "cleanup window" for time-shifting.

For instance, if a live media is already ingested by the service provider with a relatively larger cleanup window (e.g., in the range of 6 to 72 hours by way illustration) that allows time-shifting, an embodiment of the present invention may forgo performing computations or estimations to allocate a specific amount of saved media segments in the origin/CDN server, provided the cleanup window is larger than the estimated video outage duration based on the learned white spot location database. In one implementation, the cleanup window period may be controlled by the service provider but it may also be related to or otherwise dependent upon the content rights on a per-channel or per-program basis. It will be appreciated that in some arrangements, content owners might not give rights for time-shifting or give a maximum defined period that may be variable. Accordingly, if the cleanup window is less than the estimated video outage duration, appropriate service logic of the mobile-optimized ABR stream delivery server may perform suitable calculations and determinations to dynamically allocate a proper cleanup window (e.g., based on the session timeout threshold value) for at least a portion of time, which may be modulated/gated the service logic depending on the relative lengths/durations of (i) provider-based cleanup window; and (ii) estimated white spot area as per the learned geo-location database. In one arrangement, the time used for the cleanup window could be the same time used to keep the video session alive e.g., in the proxy. As described previously, this is the estimated time to travel through the video outage area, which could be dynamically configured on a per session/video outage basis. In either scenario, the wireless UE device may be configured to receive appropriate manifests for accessing the TS media segments for at least a portion of the video outage area from the origin/CDN location, the remaining TS media segments being provided from the nodes 608/610.

If the live media is not time-shifted by the service provider, the embodiments of the present invention provide for dynamic TS windowing by the mobile-optimized ABR stream delivery server (e.g., involving nodes 608/610), wherein the ABR client will resume streaming TS media segments from a proper media segment in the streaming session upon exiting the white spot area as described previously.

Those skilled in the art will appreciate upon reference hereto that regardless of whether a service provider-based cleanup window is provided, embodiments set forth herein are operative to provide, use, obtain or determine a time-shifting window that can be defined dynamically, and preferably be based on or related to an estimated video outage duration that an ABR client may be determined to encounter. Further, at least some of the foregoing processes may also be performed with suitable modifications in a client-assisted configuration as will be described further below.

Turning to FIG. 8, depicted therein is a portion 800 of the network environment 400 wherein an ABR streaming session resumption process 900 may be practiced according to the embodiment shown in FIG. 9. As the UE-carrying vehicle 410 exits the video outage area 408 and begins to enter the coverage area 404-2, it may experience improved radio signal quality. The ABR stream delivery server 414 and/or associated delivery control module 416 may determine that the UE-carrying vehicle or client device 410 has exited the video coverage area (block 902). Service logic executing thereat may further be configured to determine if the UE/client device requested new variants or a master manifest (block 904). If so, it is determined that the live media session was terminated for some reason (e.g., no ad playout during the outage). Accordingly, instead of updated TS manifests, non-TS manifests are provided to the ABR client to restart the ABR live media streaming session at a current time point in the live programming (block 906). If the live media session was not terminated during the outage, the ABR stream delivery server 414 may update or modify the manifest file in an example implementation to include URLs that point to one or more notification messages (e.g., locally cached) appropriate to the exiting state, followed by pointers to time-shifted ABR live media segments starting at the segment adjacent to the last live media segment what was delivered prior to video outage (block 908). Thereafter, the updated manifest file(s) may be transmitted (block 910) to the UE device 410, as shown by path 802 in FIG. 8. Responsive to the updated manifest files, the ABR client application on the wireless UE device commences play back of the locally stored message segment(s) apprising the user of video outage exit condition and subsequent commencement of the time-shifted ABR media segments at a suitable point (block 912), which may involve interfacing 808 of the ABR stream delivery server system 414/416 with the session-based ABR time-shifting subsystem 608 for receiving the TS media segments. Also, updated manifests and segments for the TS ads are also received and/or provided where no ad credit allocation was enabled.

It will be realized that the media and/or ad segment pull may be bandwidth-controlled depending on the dynamic signal conditions of the new coverage area, e.g., starting with low bitrate segments and gradually ramping the bitrate quality. For example, the ABR streaming session set up in FIG. 8 involves a segment pull rate of 250 Kbs, lowest ABR encoded bitrate of 500 Kbs and highest ABR manifest bitrate of 2 Mbs, the resumed streaming session initially throttles at pulling 500 Kbs media segments, delivered via a path 804 to base station 402-2 as shown in FIG. 8. Also, network entity 414/416 may interface with video quality location awareness server 418 and associated geo-location database 420 via suitable request/response messages (e.g., similar to request 430 and response 432 described hereinabove with respect to FIG. 4), to obtain future video outage locations and effectuate pre-populating/pre-caching of relevant alternative ad content with respect to such locations, as the additional bandwidth progressively becomes more available (block 914).

FIG. 10 depicts another network rendition 1000 corresponding to the network environment 400 wherein location-specific, user-targeted advertisements may continue to be pre-cached as the wireless UE device 410 is anticipated to encounter another outage area 1018 of the network in its expected route 1001 traversing the service area 404-2. Analogous to the coverage area 404-3 described hereinabove, coverage area 404-2 of base station 402-2 is shown to include a plurality of concentric signal quality/strength contours 1020-1 to 1020-3, each depicted with a respective signal level indicator icon, 1022-1 to 1022-3, respectively. Contour 1020-1 having the highest signal quality is closest to base station 402-2, whereas contours 1020-2 and 1020-3 are spaced further away from the base station, with progressively deteriorating signal quality (i.e., strength, level, etc.). For example, area enclosed by contour 1020-1 may have sufficient signal strength to support an overall bandwidth of 8 Mbs, whereas areas enclosed between contours 1020-1 and 1020-2 and between contours 1020-2 and 1020-2 may support overall UE bandwidths of 2 Mbs and 500 Kbs, respectively. When the wireless UE device 410 is within the area enclosed by contour 1020-1, service logic associated with the ABR stream delivery server 414 and/or associated delivery control module 416 is operative to determine that given the highest bitrate of ABR streaming session as being 2 Mbs, there exists additional bandwidth for pushing updated advertisements and notification messages relevant with respect to the next likely outage area 1018 based on the current heading, direction, and/or speed information associated with the estimated route 1001. Similar to the request/response messages 430/432, the ABR stream delivery server 414 and/or associated delivery control module 416 is operative to query the video quality location awareness server 418 and associated geo-location database 420 again via a request message 1002 containing updated location/heading information. Responsive thereto, a response 1004 containing updated video outage area information, including, e.g., its coordinates and an estimate of how long it will take to traverse the outage area, etc., is provided. Using request/response queries 1006/1008 similar to request/response queries 434/436, and request/response queries 1012/1014 similar to request/response queries 440/442, the ABR stream delivery server 414 and/or associated delivery control module 416 is operative to obtain appropriate advertisement segments and notification messages for pushing to the wireless UE device 410, in a manner similar to the process set forth in FIG. 5 described above, suitably modified with respect to the new video outage area 1018. As it has been determined that there is sufficient bandwidth for effectuating streaming of highest bitrate media segments, the functionality of network entity 414/416 is operative to throttle the delivery of time-shifted ABR segments at 2 Mbs via base station 402-2 as exemplified by path 1018. Further, the network entity 414/416 commences managed bandwidth push of advertisement media segment(s) and associated manifest(s) as well as the custom message notification(s) and associated manifest(s) to the wireless UE device 410, via base station 402-2 as exemplified by path 1016, with a throttled delivery rate based on the additional bandwidth amount available, similar to the functionalities set forth at block 530 of FIG. 5.

It will be realized that in the foregoing embodiments redirection of ABR play-back in anticipated outage areas (i.e., from ABR media segments to alternative content and back to ABR media segments) is mainly controlled by the network-based functionalities (e.g., the ABR stream delivery server 414 and/or associated delivery control module 416 in conjunction with other network nodes, which may involve content servers, TS subsystem nodes, etc. that may be virtualized in a cloud platform) wherein the network-based or cloud-based service logic is operative to determine when an ABR client device is in the outage area and dynamically adjust the manifest URLs to the stored buffer locations within the UE device for commencing the alternative content cached thereat. As seen from the detailed description hereinabove, some of the embodiments may also provide for appropriate message notifications to the user to facilitate a richer and more helpful experience with respect to transitioning in and out of radio white spot areas.

Figure 11A:
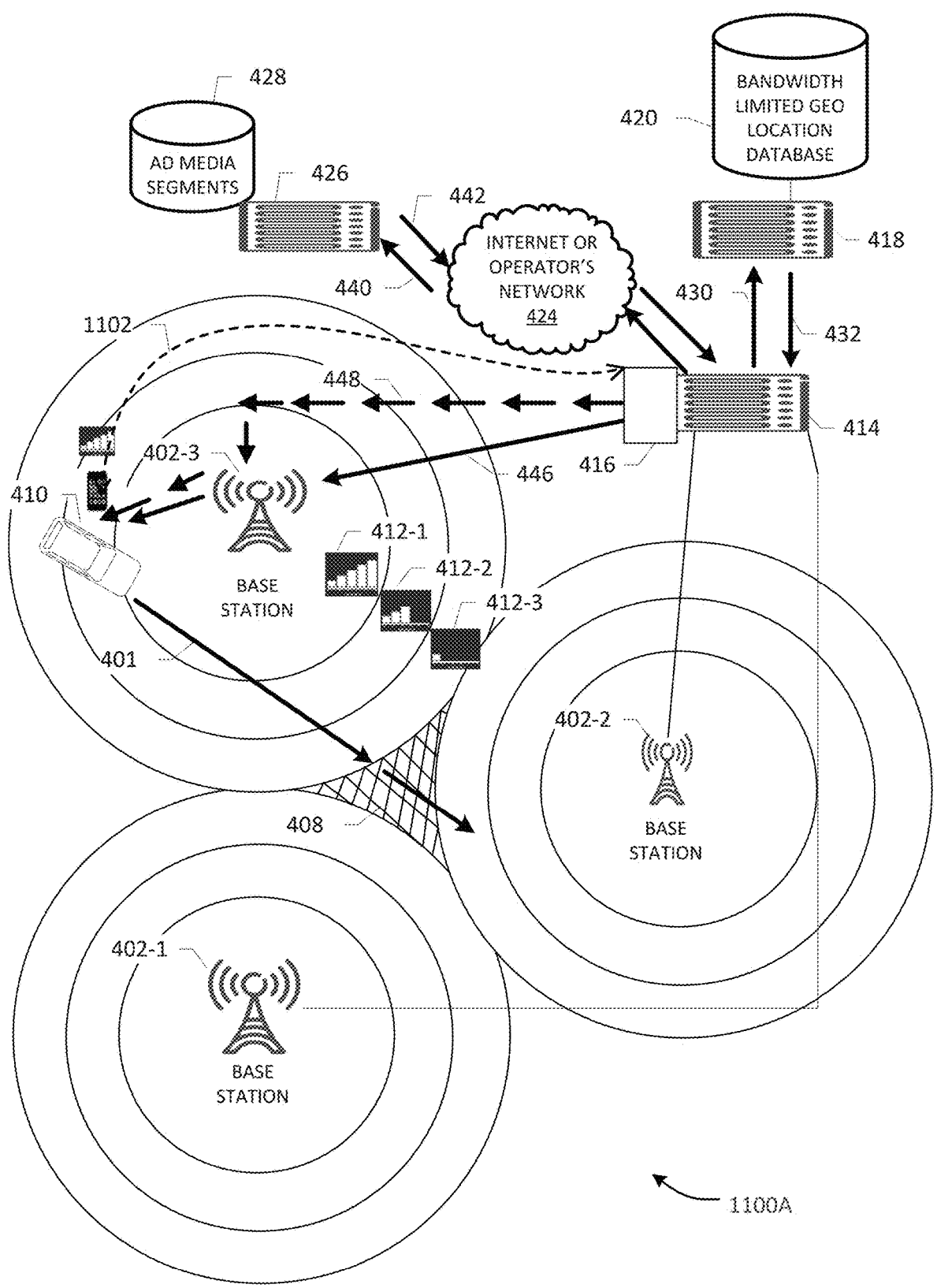
FIGS. 11A-11C depict additional details with respect to an example wireless network environment configured to support ABR live media streaming and associated methods relating to video white spot coverage in accordance with another group of embodiments of the present patent disclosure.
Figure 11B:
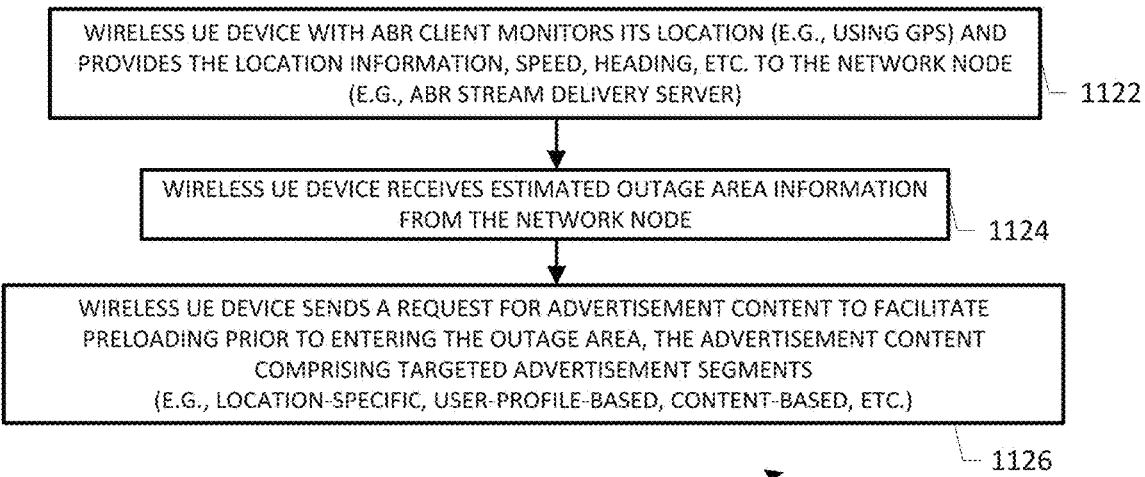
Figure 11C:
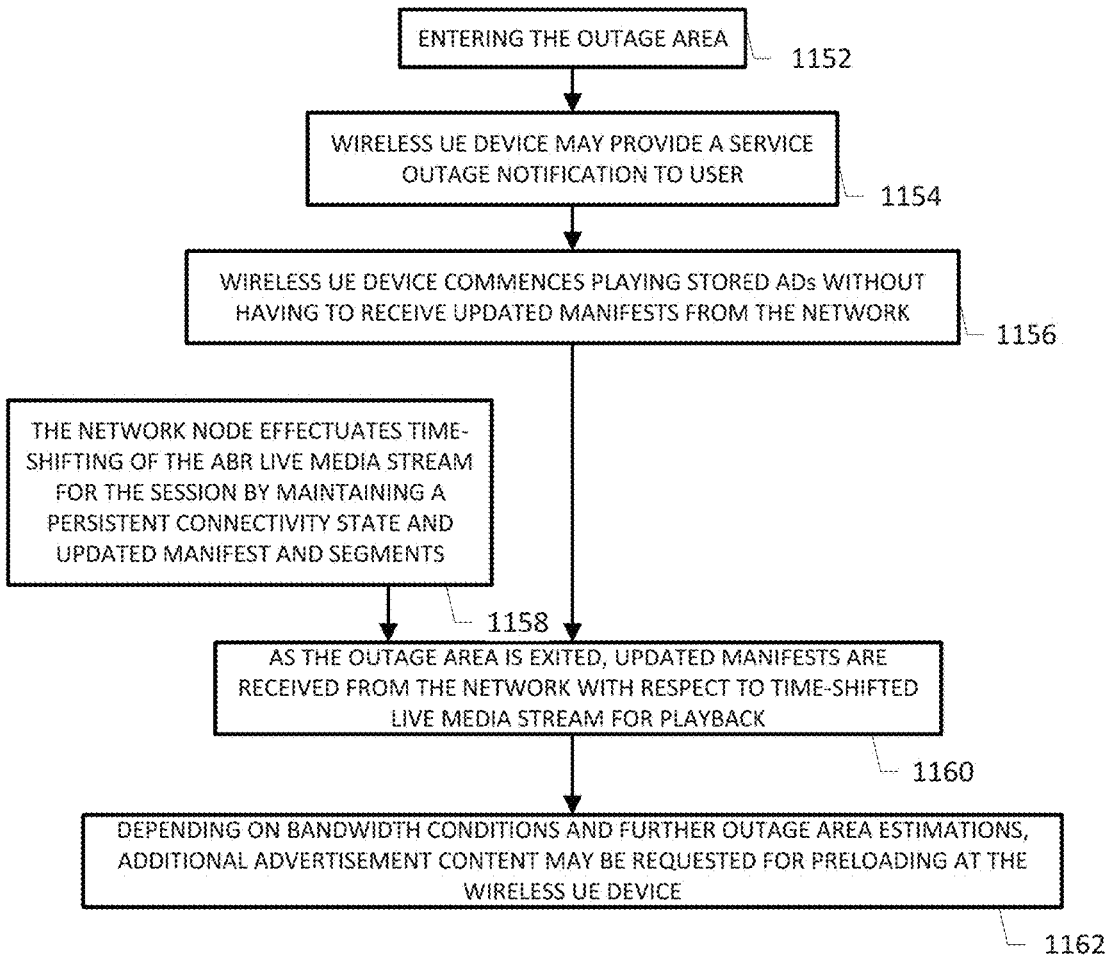
Figure 12:
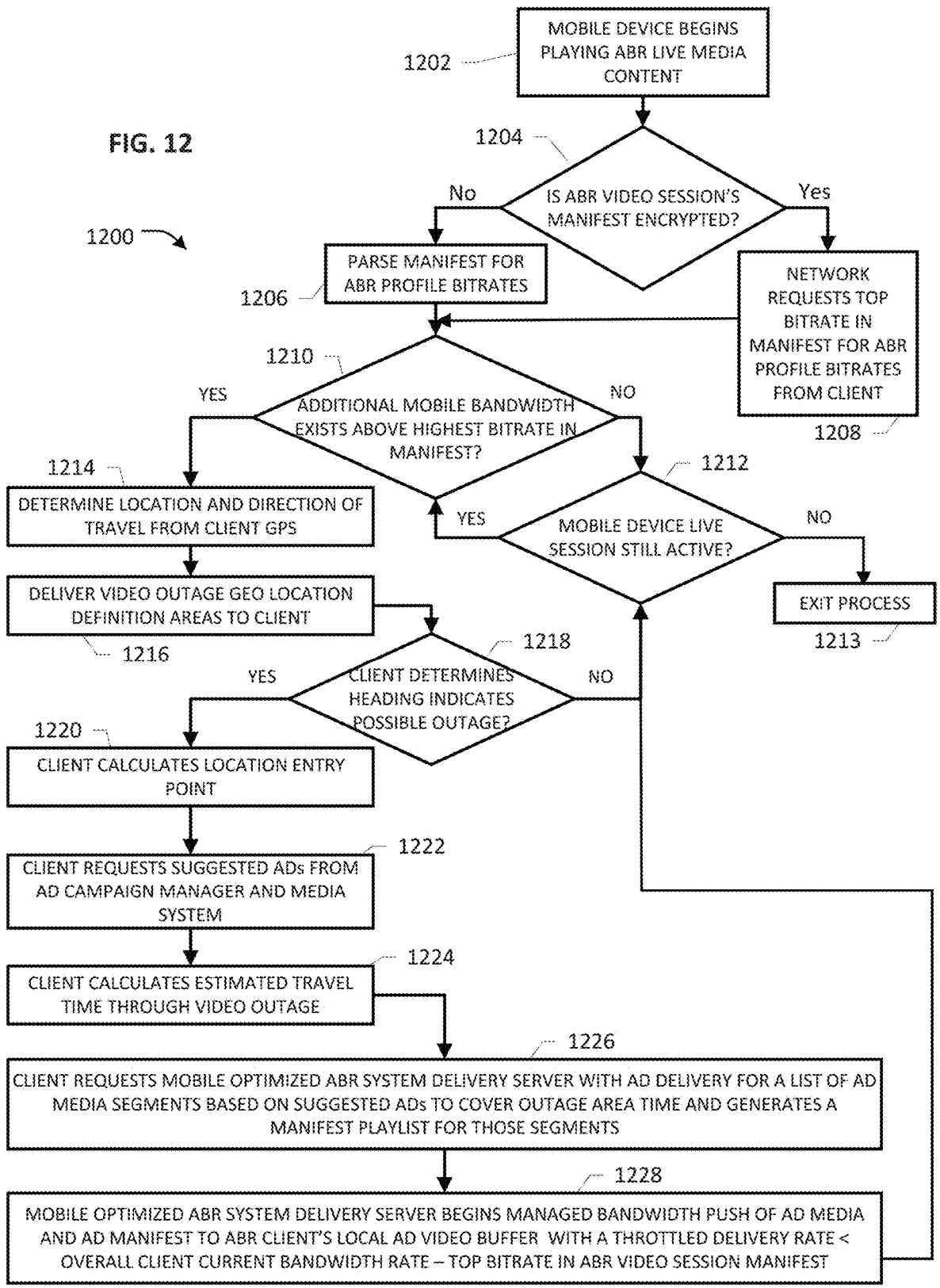
FIGS. 12-16 depict further details with respect to the embodiments shown in FIGS. 11A-11C.
Figure 13A:
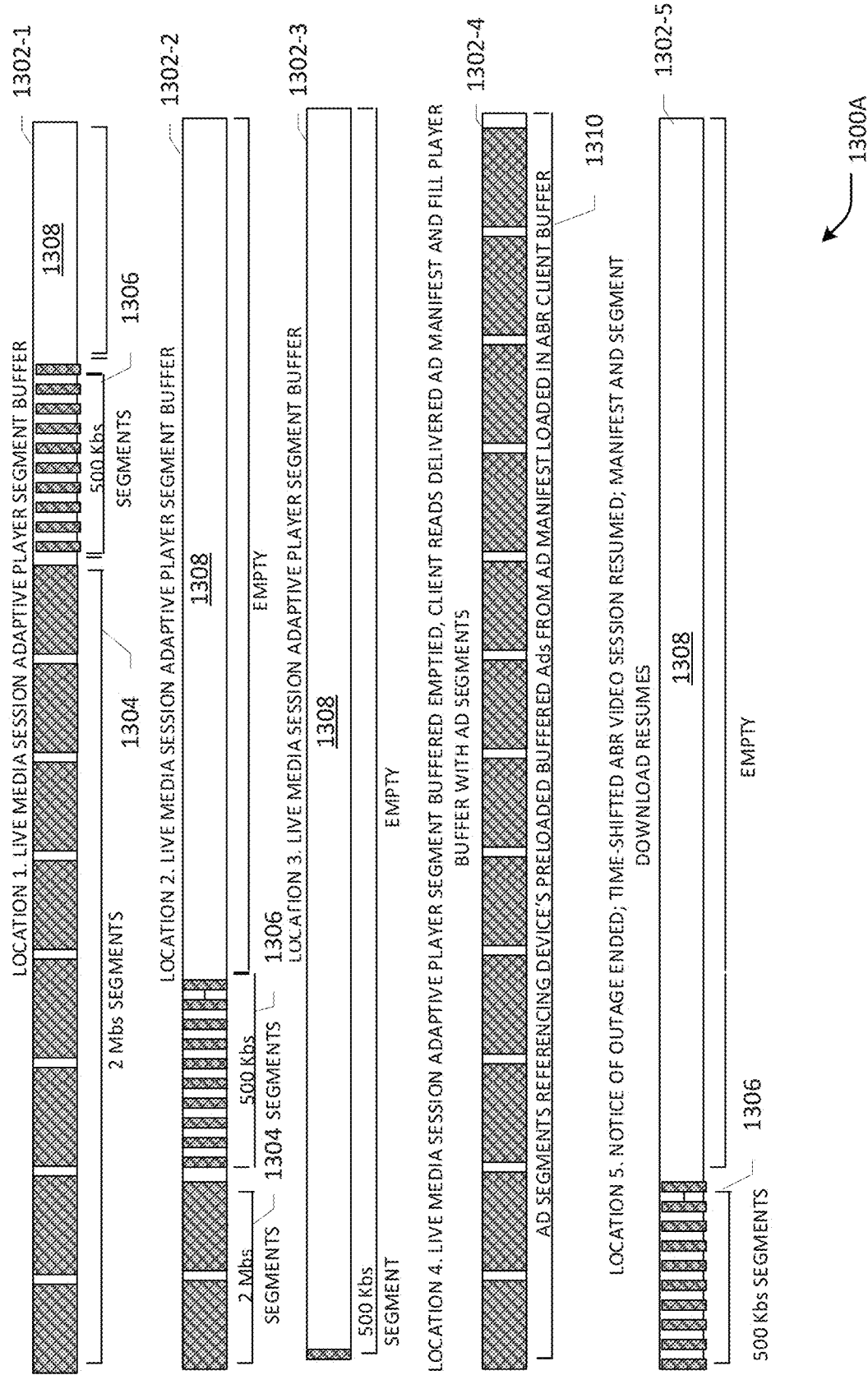
Figure 14:
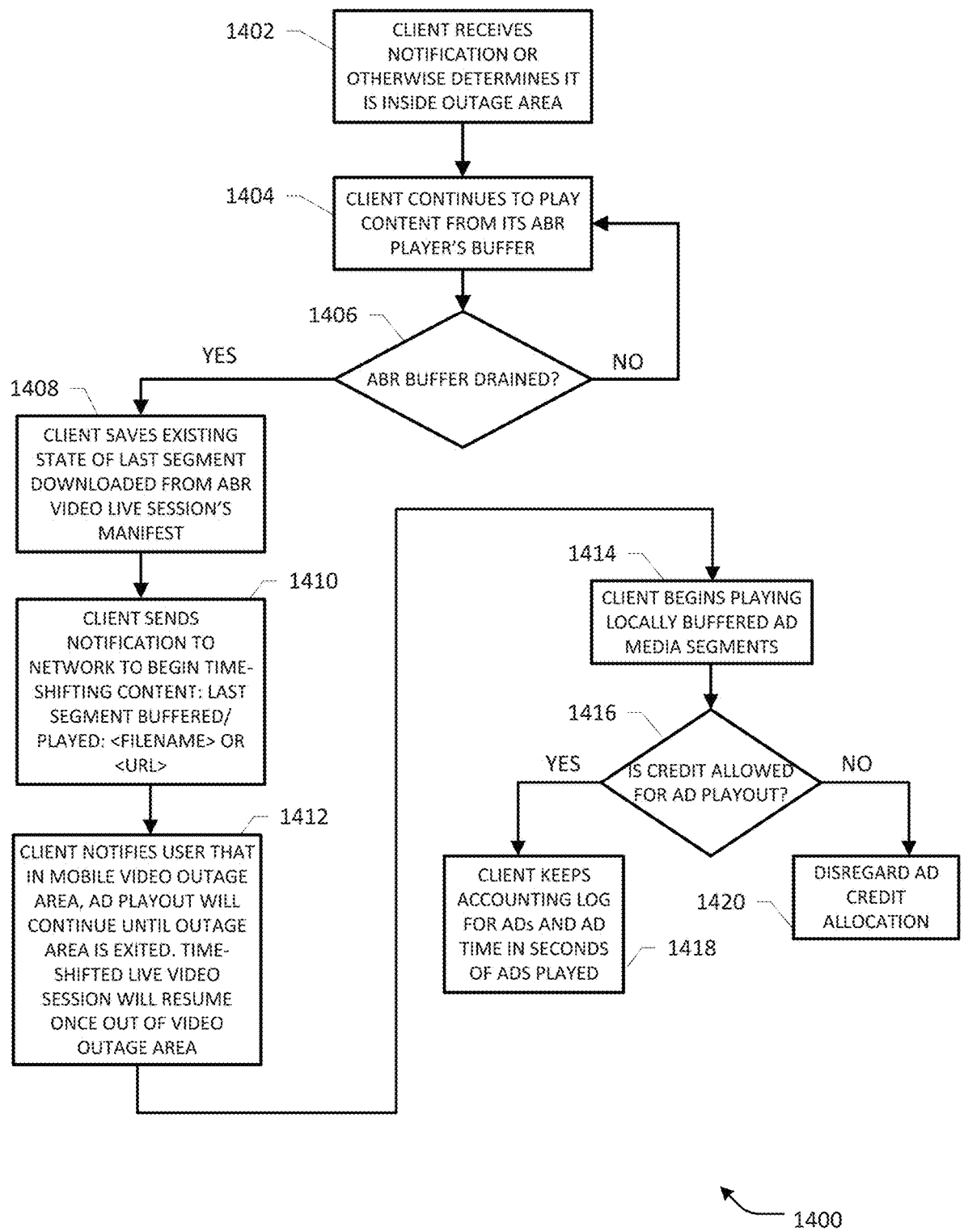
Figure 15:
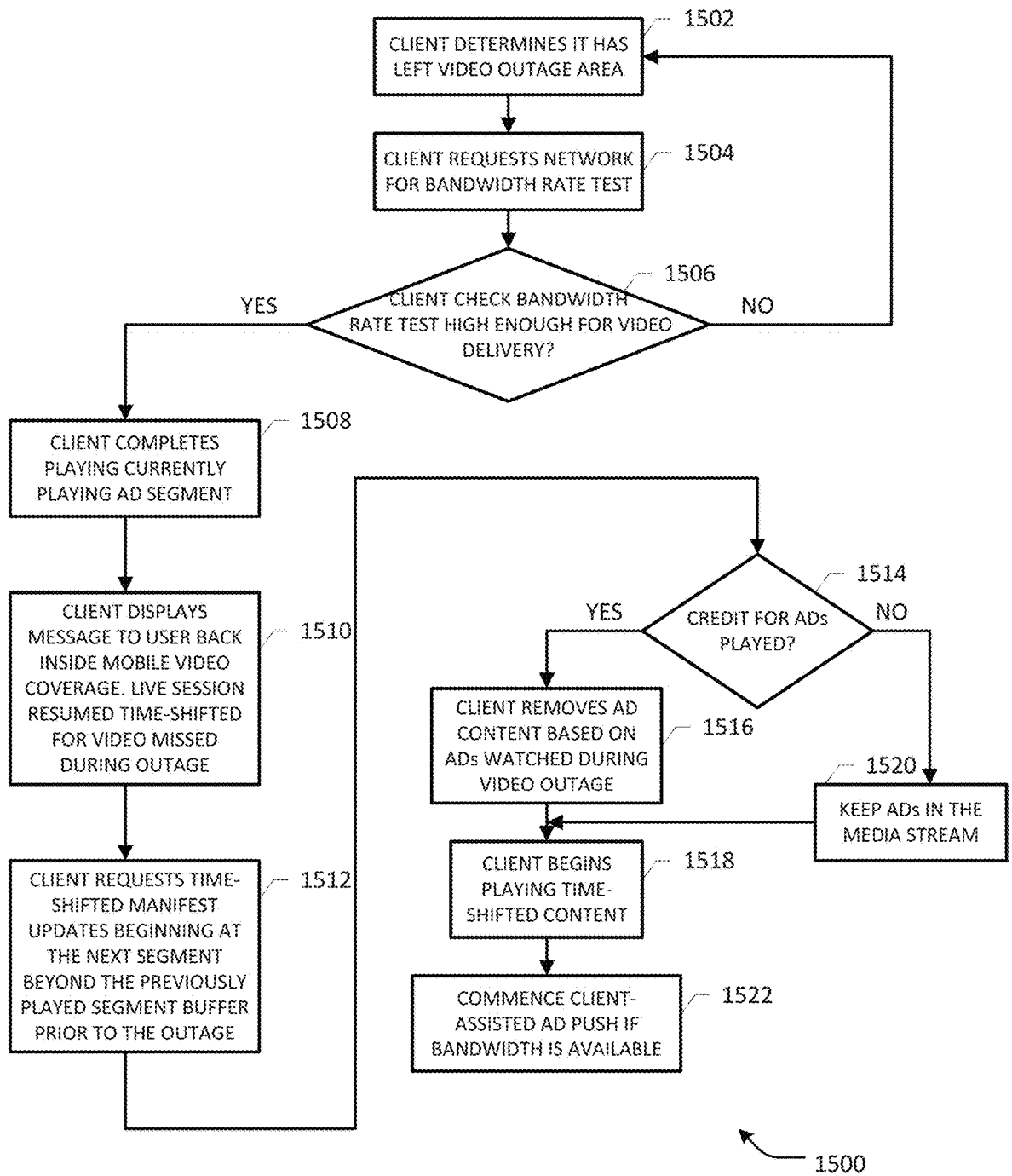
Figure 16:
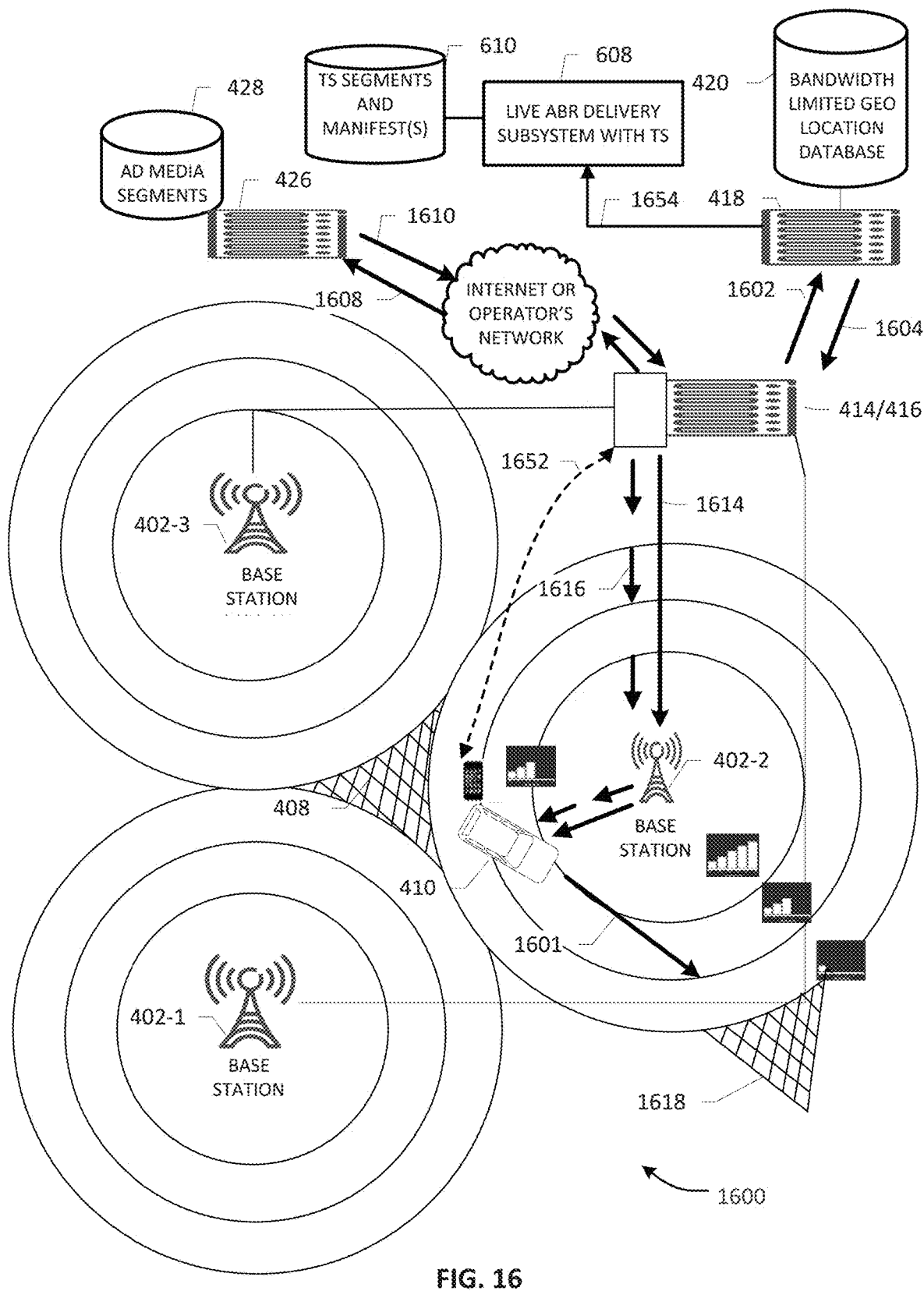

In certain other embodiments of the present patent disclosure, a client-specific or client-controlled redirection may be implemented in an example configuration, especially where custom ABR clients are deployed. In such implementations, when the ABR client receives or otherwise obtains a notification that it is in an area of non-sustainable video bandwidth, it automatically begins playing buffered alternative content until it is determined that the client has traversed through the video outage area. FIGS. 11A-11C depict embodiments with respect to client-assisted time-shifting and ad play in an example wireless network environment optimized for ABR live media streaming. FIGS. 12-16 depict further details regarding the embodiments shown in FIGS. 11A-11C. Broadly, FIGS. 11A-11C and 12 relate to a wireless network environment 1100A and one or more processes and/or sub-processes associated therewith for effectuating a client-controlled advertisement push process and session resumption process. FIG. 13A depicts example ABR buffer status/condition in a client-controlled play out scenario relative to various locations as the client encounters and traverses through a video outage area as illustrated in FIG. 13B. FIGS. 14 and 15 depict example advertisement play out process 1400 and ABR streaming session resumption process 1500, respectively, in additional. Finally, FIG. 16 depicts another network rendition 1600 corresponding to the wireless network environment 1100 wherein advertisements continue to be pushed in a client-controlled manner as the wireless UE device is anticipated to encounter another outage area of the network.

It will be appreciated that instead of the network tracking the client device, the client can be configured to provide its own location monitoring and therefore receive coverage area definitions from the network defining the outage areas in the vicinity of its location in a client-assisted implementation. The client may use either its internal GPS or triangulation functionality to determine its location, rate of travel and direction or heading. In an alternative embodiment, service logic executing on the client device may be programmed or otherwise configured to make a determination as to when the client device is traveling toward an area of non-sustainable video bandwidth and request the network to pre-cache the client with targeted ads. Once the client is inside of the outage area, it may continue to attempt to download segments. These segments may be delivered slightly slower than real-time, and the client device could lose the ability to download data altogether. The client continues to play the live content until it determines if the buffer will be drained once the current and/or last segment in the buffer has been played. At this point, the client device is programmed or otherwise configured to request the ABR stream delivery server to begin the time-shift session. As before, time-shift recording for the client's session preferably begins at the requested segment. Once the client's buffer has been drained of the live content, it automatically begins playing buffered ads until it has traversed through the video outage area. As the cached ads are played, the client device preferably maintains an ad accounting log, e.g., the number of ads and duration of ads played, etc. Once the client device leaves the outage area, it can resume time-shifted live video session from a segment next to the last segment delivered to the client prior to entering the outage area. Because the client is in control of when to redirect its playout process, a finer granularity of switching between ad content and program media content playout may be provided in a client-assisted implementation. As before, various functionalities relative to client-assisted time-shifting of live media and ad playout may be virtualized in a cloud environment as well.

Taking FIGS. 11A/11B and 12 together, those skilled in the art will recognize that the example wireless network environment 1100A and associated advertisement push process 1200 are similar to the features depicted in FIGS. 4 and 5. Accordingly, the description of FIGS. 4 and 5 is also applied and incorporated here in respect of FIGS. 11A and 12, with suitable modification as needed. Focusing on the client-controlled aspects, it should be noted that the example network environment 1100A shown in FIG. 11A does not include a video-encoded message generation system in contrast to the network-controlled scenario set forth in FIG. 4. On the other hand, other network functionalities, e.g., interfacing of the ABR stream delivery server 414 and/or associated delivery control module 416 in conjunction with other wireless network nodes, geo-location database(s), advertisement media server(s), etc., remain substantially the same. The ABR client device 410 is operative to exchange a number of messages (requests, responses and queries) with the ABR stream delivery server 414/416 with respect to sending location information (block 1122), obtaining or receiving learned white spot areas (block 1124), and requesting ads for preloading and playout during an estimated outage (block 1126). In the network rendition 1100A of FIG. 11A, an interface 1102 is therefore illustrated with respect to such client-controlled interactions, set forth as an example client-assisted process 1100B in FIG. 11B. Although it is the client device that initiates an ad request for the estimated outage duration, the overall ad push process is comparable to the ad push process previously described. Accordingly, the advertisement push processes 500 and 1200 are generally similar, although some of the features of process 1200 may take place at or be triggered by a custom ABR client.

An overall client-assisted redirection and session resumption process 1100C is set forth in FIG. 11C. Upon entering an outage area (block 1152), a local service outage notification may be provided to the user (bock 1154), whereupon the stored ads may be played out without having to receive updated manifests from the network (block 1156). In the meantime, a serving network node effectuates time-shifting of the ABR live media stream and maintains a persistent state of session activity, along with updated manifests therefor, as described previously (block 1158). As the outage area is exited, updated manifests are received from the network with respect to the time-shifted content for playback (block 1160). Additional client-assisted ad pushing processes may take place, similar to the methodology discussed above, as set forth at block 1162.

According to one particular embodiment, the UE/client device 410 is determined to be engaged in an ABR live media streaming session (block 1202) in a normal streaming operation (e.g., under suitable radio conditions supportive of sufficient bandwidth). If the ABR stream delivery server 414 and/or associated delivery control module 416 determines that the manifest transport is encrypted (block 1204), it may request the ABR UE device to obtain a top bitrate in the manifest (block 1208) so as to facilitate further determinations regarding additional available bandwidth for pushing ads (block 1210). If the live media manifests are not encrypted, there is no need to query the ABR client device, as the manifests may be parsed by the network node to obtain all ABR bitrate profiles (block 1206). If there is additional bandwidth (block 1210), the network node obtains and processes location/direction information from the UE/client device (block 1214). Otherwise, the process may be terminated (block 1213) if it is determined that the live video session is no longer active (block 1212).

Responsive to the UE/client location and heading information, appropriate video outage areas may be determined upon issuing query messages to the video QoS location awareness system 418 as before. The outage area information may be provided to the UE client device 410, as set forth at block 1216, which determines whether possible service outage is indicated (block 1218). The UE client device 410 further determines an entry point with respect to the expected outage area location (block 1220) and issues a request for suggested ads to cover the outage area duration (blocks 1222, 1224). Responsive thereto, targeted ad segments and manifests are provided to the UE client device 410. It should be appreciated that an embodiment of process 1200 may not involve generating video-encoded notification messages and pushing such messages to the custom ABR client. On the other hand, a manifest playlist for the suggested advertisements that cover the estimated video outage area is generated for facilitating automatic play-back by the ABR client (block 1226). Thereafter, the advertisement manifest playlist as well as the advertisement segments are pushed to the ABR client in a managed bandwidth control process as set forth at block 1228.

Taking FIGS. 13A and 13B together, reference numeral 1300A refers to exemplary ABR buffer status at the wireless UE client device 410 as it encounters and traverses a video outage area 1300B. Preferably, the ABR buffer is operative for storing media segments received in a live media streaming session (e.g., determined to be downloaded at bitrate(s) based on a calculated bandwidth available to the ABR client) as well as any ads moved from the preloaded cache. Illustratively, video outage area 1300B having an ingress boundary 1320 and an egress boundary 1322 is another rendition of the outage areas described elsewhere herein, wherein the vehicle carrying wireless UE device 410 is shown at five specific locations—Locations 1 to 5—relative to the outage area. Reference numeral 1302-1 refers to the ABR buffer condition corresponding to Location 1. As the UE-carrying vehicle 410 approaches the ingress boundary 1320 (e.g., Location 1), it can be seen that the ABR buffer may contain a plurality of high bitrate live media segments 1304 followed by a plurality of low bitrate segments due to varying network bandwidth and/or radio signal conditions, for example. The ABR client continues to play out available high bitrate segments 1304 (e.g., 2 Mbs segments) followed by available low bitrate segments 1306 (e.g., 500 Kbs segments) as the UE-carrying vehicle 410 enters the video outage area (e.g., Location 2), leading to gradual exhaustion of the buffer, exemplified by the status condition 1303-2. As the media content in the ABR buffer is exhausted (indicated by empty buffer storage 1308), the ABR buffer is filled with the advertisement segments 1310 (e.g., moved from a local cache into the buffer) based on the associated manifest playlist, as exemplified by the status conditions 1302-3 and 1303-4 corresponding to Locations 3 and 4 of the video outage area 1300B. When the UE-carrying vehicle 410 exits the egress boundary 1322 of the video outage area 1300B, the ABR buffer begins to fill with lower quality live media segments, e.g., low bitrate segments 1306, gradually adapting to improved radio signal conditions, as illustrated by the status condition 1302-5 corresponding to Location 5.

FIG. 14 depicts an example advertisement play out process 1400 in a client-controlled environment described hereinabove. At block 1402, the wireless UE device 410 executing an ABR client application may receive a notification or otherwise determine that it is inside an outage area. It should be appreciated that in some implementations, a portion of the video outage database may be provided to the wireless UE device so that the service logic executing thereat may perform suitable control operations with respect to automatically playing back the preloaded alternative content in an outage area. Responsive to the determination that the wireless UE device is within the outage area, the ABR client application executing thereon continues to play back the available media segments from the ABR buffer associated therewith (block 1404). When the ABR buffer is eventually drained (block 1406), the ABR client device saves the existing state of the last live media segment to download based on the associated manifest (block 1408). A message may be generated to the network node to begin time-shifting of the ABR live media streaming session from the segment following the last segment downloaded (block 1410). A locally-generated message or notification may be provided by the ABR client to the user that the UE device is in the video outrage area and time-shifted live streaming session will resume in due course, e.g., when the video outage area is exited, within a predetermined time, etc. (block 1412). Thereafter, the ABR client application commences playing (block 1414) the advertisement segments filled into the ABR buffer from a local storage without having to receive updated manifests therefor from the network. If an ad credit allocation is allowed (block 1416), the ABR client device keeps an accounting log as discussed previously (block 1418). Otherwise, ad credit allocation process is disabled and/or disregarded (block 1420).

FIG. 15 depicts an example ABR streaming session resumption process 1500 in a client-controlled environment. Similar to the features of block 1402, the wireless UE device 410 may determine or otherwise obtain a notification that it has exited an outage area (block 1502). A client-initiated bandwidth rate test may be issued to the network node as an additional "insurance" to determine if there is enough bandwidth for video delivery (blocks 1504 and 1506). If so, the ABR client application determines that an advertisement segment is currently being played and proceeds to complete playing that current advertisement segment (block 1508). Upon determining that the wireless UE device has sufficient radio signal quality, a notification may be provided to the user that video coverage is available and streaming of time-shifted content may be resumed (block 1510). The UE device requests updated manifests for the time-shifted content starting at the correct media segment (block 1512). If there was credit allocation for ads (block 1514), the UE client device removes the ad content from the resumed TS media stream, e.g., based on the ads watched during video service outage (block 1516). Otherwise, the ad segments continue to be maintained in the TS media stream at their respective ad insertion points (block 1520). The ABR client application of the UE device resumes playing TS media stream at the next segment beyond the previously played segment prior to the outage (block 1518). Thereafter, client-controlled advertisement pushing may continue as additional bandwidth becomes available (block 1522), similar to the features set forth at block 914 in FIG. 9.

FIG. 16 depicts another rendition 1600 corresponding to the wireless network environment 1100 wherein location-specific and/or user-specific advertisements are pre-cached as the wireless UE device 410 is anticipated to encounter another outage area 1618 of the network in its expected route 1601 traversing through the service area of base station 402-2. Analogous to the scenario depicted in FIG. 10, suitable request/response queries 1602/1604 with respect to the video quality location awareness server 418 and associated geo-location database 420 may be executed by the ABR stream delivery server 414 and/or associated delivery control module 416 relative to the expected route 1601, e.g., based on location, speed, heading, etc. A communication interface 1652 is maintained between the wireless UE device 410 and the network node(s) 414/416 to continue client-assisted operations relative to providing location information and obtaining video outage area definitions in response thereto. Pursuant to client-initiated ad requests as before, suitable request/response queries 1608/1610 may be effectuated for obtaining appropriate advertisement segments to be pushed to the wireless UE device 410, in a manner similar to the process set forth in FIG. 12 described above. The new set of advertisement segments are specific and relevant with respect to the new video outage area 1618 and may take up shorter or longer duration than the advertisement clips previously provided relative to the earlier outage area 408 (i.e., updating of locally-cached alternative content on outage area basis). As it has been determined that there is sufficient bandwidth for effectuating streaming of highest bitrate media segments, the functionality of network entity 414/416 is operative to throttle the delivery of ABR media segments at 2 Mbs via base station 402-2 as exemplified by streaming session path 1616. Further, the network entity 414/416 commences managed bandwidth push of advertisement media segment(s) and associated manifest playlist to the wireless UE device 410, via base station 402-2 as exemplified by advertisement push path 1614, with a corresponding throttled delivery rate based on the additional bandwidth amount available, similar to the functionalities set forth at block 530 of FIG. 5 and block 1228 of FIG. 12.

Figure 17:
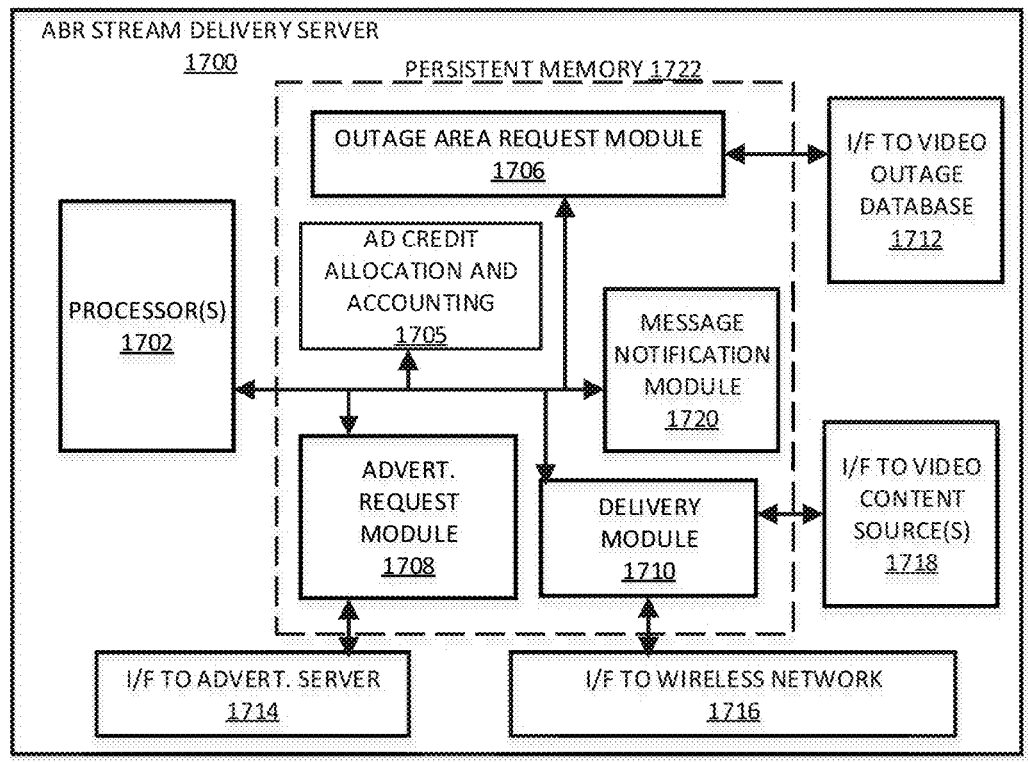
FIG. 17 depicts a block diagram of an example network element configured to execute certain aspects according to one or more embodiments of the present patent application.

FIG. 17 depicts a block diagram of an example network element 1700 configured to execute certain aspects according to one or more embodiments of the present patent application. By way of illustration, network element 1700 is exemplary of a mobile-optimized ABR stream delivery server and/or associated delivery control module described above, which may be provided as part of an RNC or virtualized in a cloud according to certain embodiments. One or more processors 1702 may be provided for controlling a plurality of subsystems, at least a portion of which may be implemented as a combination of hardware and software modules stored as instructions or program code in suitable persistent memory 1722. An outage area request module 1706 is configured to effectuate suitable request/response mechanisms for obtaining video outage area information via an interface 1712 to appropriate video QoS-aware location servers/databases described hereinabove. An advertisement request module 1708 is operative to effectuate suitable request/response mechanisms for obtaining advertisement segments based on the video outage information and/or user demographic information, etc., via an interface 1714 to one or more advertisement servers/databases. An ad credit allocation and accounting module 1705 is provided for determining and verifying whether credit allocation is enabled for ad playout during outage in accordance with an network-based embodiment of the present patent application. A message notification module 1720 may optionally be included for obtaining video-encoded notification messages in a network-controlled implementation of ABR streaming redirection. A delivery control module 1710 is operative to effectuate segment encoding, user session segment delivery and advertisement push as well as appropriate bandwidth control for sessions via radio interfaces 1716 with respect to a serving wireless network. Additionally, network element 1700 may also include appropriate interfacing 1718 with respect to live content sources and/or associated delivery networks as well as time-shifted media and manifest subsystems.

It will be realized that at least a portion of the program instructions stored in the memory 1722 may be configured to execute one or more of the network-centric processes set forth hereinabove, including but not limited to TS operations and maintaining persistent live media session states for configurable time durations.

Figure 18:
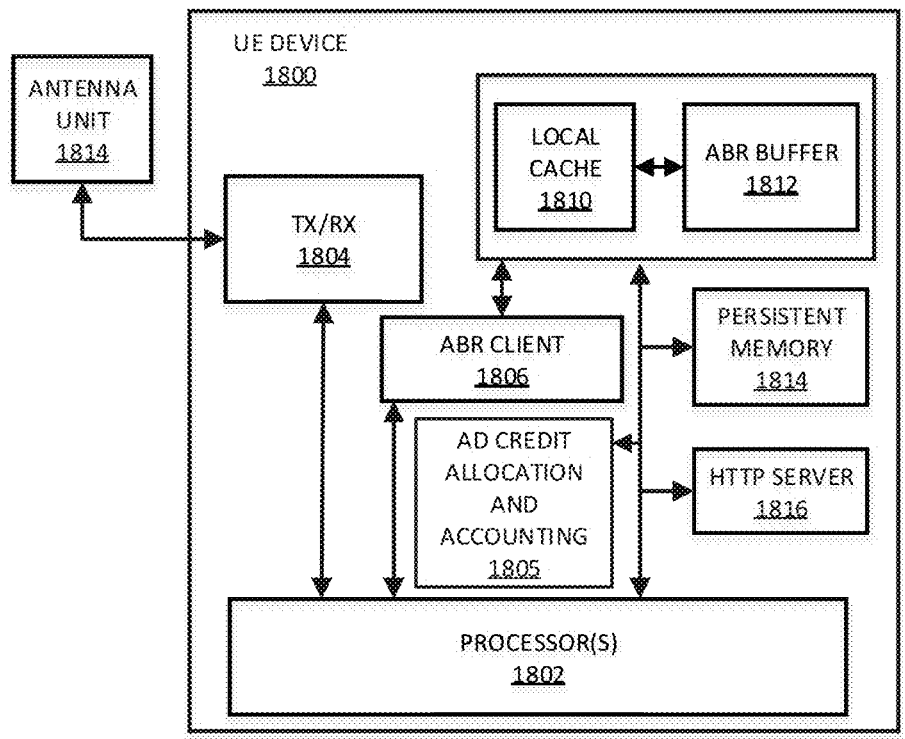
FIG. 18 depicts a block diagram of an example wireless user equipment (UE) device including an ABR client configured to execute certain aspects according to one or more embodiments of the present patent application.

FIG. 18 depicts a block diagram of an example subscriber end station operative as a wireless UE device 1800 including an ABR player or client 1806 configured to execute certain aspects under control of processor(s) 1802 according to one or more embodiments of the present patent application. Appropriate transceiver (Tx/Rx) circuitry 1804 coupled to an antenna unit 1814 is operative to effectuate radio communications for purposes of the present disclosure including, e.g., streaming of media, pre-caching of advertisements and notification messages, etc. in addition to other standard cellular telephony/data communications. The ABR client 1806 is operative to play out segments stored in an ABR buffer 1812, which may be filled with preloaded content from a local cache 1810 in certain embodiments described above. An ad credit allocation and accounting module 1805 is provided for determining and verifying whether credit allocation is enabled for ad playout during outage in accordance with a client-based embodiment of the present patent application. An HTTP server 1816 may be provided in certain embodiments for facilitating internal referencing of manifest URLs corresponding to locally cached content. In one implementation, the functionality of HTTP server 1816 may be implemented as executable code portion stored in a persistent memory module 1814. Additionally, the persistent memory module 1814 may also comprise various code portions for effectuating at least some of the processes described hereinabove.

Based upon the foregoing Detailed Description, it should be appreciated that one or more embodiments of the present disclosure can be advantageously implemented in a number of wireless ABR streaming environments that may include legacy client applications and/or custom client applications. By detecting potential video outage areas in a wireless network environment, better network service behavior can be achieved for any location-based service involving video streaming, for example.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. For example, at least some of the nodes shown in the wireless streaming network environments of FIG. 4 and FIG. 11A such as the ABR stream delivery server and/or associated delivery control module, video-encoded message generation system, video outage area location server and associated database(s), for example, may be integrated or otherwise co-located in different combinations, including as part of an RNC node. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

One skilled in the art will further recognize that various apparatuses, subsystems, functionalities/applications and/or one or more network elements as well as the underlying network infrastructures set forth above for facilitating video outage coverage may be architected in a virtualized environment according to a network function virtualization (NFV) architecture in additional or alternative embodiments of the present patent disclosure. For instance, various physical resources, services, applications and functions set forth herein above with respect to an example ABR streaming network environment may be provided as virtual appliances, machines or functions, wherein the resources and applications are virtualized into suitable virtual network functions (VNFs) or virtual network elements (VNEs) via a suitable virtualization layer. In such embodiments, resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Accordingly, at least a portion of an example network architecture disclosed herein may be virtualized as set forth above and architected in a cloud-computing environment comprising a shared pool of configurable virtual resources. Various pieces of software, e.g., TS operations, ad credit allocation, TS media/ad storage, subscriber management, etc., as well as platforms and infrastructure of a network may be implemented in a service-oriented architecture, e.g., Software as a Service (SaaS), Platform as a Service (PaaS), infrastructure as a Service (IaaS) etc., with involved parties providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operating at a network node disposed in an adaptive bitrate (ABR) live media streaming network, the method comprising:
   determining that a wireless user equipment (UE) device engaged in a streaming session of an ABR live media stream including one or more media content segments and one or more advertisements has entered a video outage area;
   obtaining a time duration of service outage associated with the video outage area depending on an estimated travel direction and an estimated speed of the wireless UE device;
   time-shifting the ABR live media stream for at least the time duration of service outage;
   enabling credit allocation for advertisements in the time-shifted ABR live media stream;
   maintaining an accounting log of one or more wireless UE device-stored advertisements played by the wireless UE device while traversing the video outage area; and
   omitting updating of a manifest associated with at least one time-shifted advertisement based at least on the accounting log, the omitting further responsive to a determination that a wireless UE device-stored advertisement played by the wireless UE device while traversing the video outage area is recognized as the at least one time-shifted advertisement of the time-shifted ABR live media stream, thereby causing the at least one time-shifted advertisement to be skipped when the wireless UE device resumes playing the time-shifted ABR live media stream upon exiting the video outage area.

2. The method as recited in claim 1, further comprising configuring an ad credit shift limit time window associated with credit allocation for advertisements in the time-shifted ABR live media stream for selectively omitting updating of manifests of time-shifted advertisements depending on whether an advertisement played by the wireless UE device is within the ad credit shift time window.

3. The method as recited in claim 1, wherein the wireless UE device-stored advertisements comprise one or more local, regional or national advertisement segments targeted based on a user demographic profile associated with the wireless UE device.

4. The method as recited in claim 1, wherein the wireless UE device-stored advertisements comprise one or more local, regional or national advertisement segments targeted based on content type of the ABR live media streaming session.

5. The method as recited in claim 1, wherein the wireless UE device-stored advertisements comprise location-based advertisement content relative to the video outage area.

6. The method as recited in claim 1, further comprising:
   maintaining a persistent connectivity state for the streaming session while the wireless UE device is traversing the video outage area;
   responsive to determining that the wireless UE device stopped playing the wireless UE device-stored advertisements while traversing the video outage area, terminating the persistent connectivity state for the ABR live media streaming session; and
   providing a manifest associated with a non-time-shifted ABR live media stream to the wireless UE device when the wireless UE device exits the video outage area.

7. A network node disposed in an adaptive bitrate (ABR) live media streaming network for facilitating control of advertisements delivered during ABR live media streaming sessions, the network node comprising:
   one or more processors; and
   a persistent memory coupled to the one or more processors and having program instructions stored thereon which, when executed by the one or more processors, perform following acts:
   determine that a wireless user equipment (UE) device engaged in a streaming session of an ABR live media stream including one or more media content segments and one or more advertisements has entered a video outage area;
   obtain a time duration of service outage associated with the video outage area depending on an estimated travel direction and an estimated speed of the wireless UE device;
   cause the ABR live media stream to be time-shifted for at least the time duration of service outage;
   enable credit allocation for advertisements in the time-shifted ABR live media stream;
   maintain an accounting log of one or more wireless UE device-stored advertisements played by the wireless UE device while traversing the video outage area; and
   omit updating of a manifest associated with at least one time-shifted advertisement based at least on the accounting log, the omitting further responsive to a determination that a wireless UE device-stored advertisement played by the wireless UE device while traversing the video outage area is recognized as the at least one time-shifted advertisement of the time-shifted ABR live media stream, thereby causing the at least one time-shifted advertisement to be skipped when the wireless UE device resumes playing the time-shifted ABR live media stream upon exiting the video outage area.

8. The network node as recited in claim 7, wherein the program instructions further comprise instructions for configuring an ad credit shift limit time window associated with credit allocation for advertisements in the time-shifted ABR live media stream for selectively omitting updating of manifests of time-shifted advertisements depending on whether an advertisement played by the wireless UE device is within the ad credit shift time window.

9. The network node as recited in claim 7, wherein the program instructions further comprise instructions for performing:
   maintaining a persistent connectivity state for the streaming session while the wireless UE device is traversing the video outage area;
   responsive to determining that the wireless UE device stopped playing the wireless UE device-stored advertisements while traversing the video outage area, terminating the persistent connectivity state for the ABR live media streaming session; and
   providing a manifest associated with a non-time-shifted ABR live media stream to the wireless UE device when the wireless UE device exits the video outage area.

10. A non-transitory computer-readable medium containing program instructions stored thereon which, when executed by one or more processors of at least a network node disposed in an adaptive bitrate (ABR) live media streaming network for facilitating control of advertisements delivered during ABR live media streaming sessions, the non-transitory computer-readable medium comprising:

a code portion for determining that a wireless user equipment (UE) device engaged in a streaming session of an ABR live media stream including one or more media content segments and one or more advertisements has entered a video outage area;

a code portion for obtaining a time duration of service outage associated with the video outage area depending on an estimated travel direction and an estimated speed of the wireless UE device;

a code portion for time-shifting the ABR live media stream for at least the time duration of service outage;

a code portion for enabling credit allocation for advertisements in the time-shifted ABR live media stream;

a code portion for maintaining an accounting log of one or more wireless UE device-stored advertisements played by the wireless UE device while traversing the video outage area; and a code portion for omitting updating of a manifest associated with at least one time-shifted advertisement based at least on the accounting log, the omitting further responsive to a determination that a wireless UE device-stored advertisement played by the wireless UE device while traversing the video outage area is recognized as the at least one time-shifted advertisement of the time-shifted ABR live media stream, thereby causing the at least one time-shifted advertisement to be skipped when the wireless UE device resumes playing the time-shifted ABR live media stream upon exiting the video outage area.

11. The non-transitory computer-readable medium as recited in claim 10, further comprising a code portion for configuring an ad credit shift limit time window associated with credit allocation for advertisements in the time-shifted ABR live media stream for selectively omitting updating of manifests of time-shifted advertisements depending on whether an advertisement played by the wireless UE device is within the ad credit shift time window.

12. The non-transitory computer-readable medium as recited in claim 10, further comprising:

a code portion for maintaining a persistent connectivity state for the streaming session while the wireless UE device is traversing the video outage area;

a code portion, responsive to determining that the wireless UE device stopped playing the wireless UE device-stored advertisements while traversing the video outage area, for terminating the persistent connectivity state for the ABR live media streaming session; and a code portion for providing a manifest associated with a non-time-shifted ABR live media stream to the wireless UE device when the wireless UE device exits the video outage area.

* * * * *